United States Patent
Satoh

(10) Patent No.: US 7,623,854 B2
(45) Date of Patent: Nov. 24, 2009

(54) INFORMATION ADDITION SYSTEM AND MOBILE COMMUNICATION TERMINAL

(75) Inventor: Takao Satoh, Iwaki (JP)

(73) Assignee: Alpine Electronics, Inc., Shinagawa-Ku, Tokyo (JP)

( * ) Notice: Subject to any disclaimer, the term of this patent is extended or adjusted under 35 U.S.C. 154(b) by 530 days.

(21) Appl. No.: 11/503,670

(22) Filed: Aug. 14, 2006

(65) Prior Publication Data
US 2007/0054704 A1  Mar. 8, 2007

(30) Foreign Application Priority Data
Sep. 6, 2005   (JP) ............................. 2005-258520

(51) Int. Cl.
*H04M 3/00* (2006.01)
(52) U.S. Cl. .................... 455/420; 455/463; 455/74.1; 455/456.1; 455/569.1
(58) Field of Classification Search ................ 455/463, 455/420, 74.1, 456.1, 569.1
See application file for complete search history.

(56) References Cited

U.S. PATENT DOCUMENTS

| | | | |
|---|---|---|---|
| 6,459,782 B1 * | 10/2002 | Bedrosian et al. ...... | 379/201.08 |
| 7,012,995 B2 | 3/2006 | Hatamura | |
| 7,130,647 B2 * | 10/2006 | Sakai et al. ................. | 455/463 |
| 2004/0068525 A1 * | 4/2004 | Yamazaki .................... | 707/201 |
| 2005/0170845 A1 * | 8/2005 | Moran ...................... | 455/456.1 |

* cited by examiner

*Primary Examiner*—Sanh D Phu
(74) *Attorney, Agent, or Firm*—Brinks Hofer Gilson & Lione

(57) ABSTRACT

An information addition system acquires data and a control signal from a hands-free apparatus and a navigation apparatus. The hands-free apparatus is connected to a mobile communication terminal and includes an address-book data storage unit that associates communication-partner information of the mobile communication terminal with name information and stores the associated information in a personal information database as first personal information. The information addition system includes an additional information acquiring unit that acquires date and time information at an outgoing or incoming call from the navigation apparatus as first additional information and that acquires predetermined information at the outgoing or incoming call as second additional information, and an information adding unit that identifies the first personal information in the personal information database on the basis of the communication-partner information and that associates the first and second additional information with the first personal information and stores the associated additional information.

34 Claims, 20 Drawing Sheets

INFORMATION ADDITION SYSTEM AND MOBILE COMMUNICATION TERMINAL

BACKGROUND

1. Field of the Disclosure

The present disclosure relates to an information addition system capable of associating a variety of information as additional information with personal information relating to communication by an electronic device using a mobile communication terminal to indicate to a user the information useful for the user in various timings and modes and to the mobile communication terminal having the personal information and the additional information.

2. Description of the Related Art

General mobile communication terminals manage personal information relating to communication, such as telephone numbers, e-mail addresses, or names that are registered with address books and generate outgoing-call historical information and incoming-call historical information at an outgoing call (in transmission) and at an incoming call (in reception). Mobile communication terminals having a browser function generate Web historical information when a user browses a Web page. Use of the address books, the outgoing-call and incoming-call historical information, and the Web historical information eliminates, for example, an operation of inputting a telephone number at an outgoing call, thus improving the user-friendliness and convenience of the mobile communication terminals. Meanwhile, electrical devices, such as in-vehicle devices, capable of accessing the Internet by the use of mobile communication terminals have come into practical use in recent years. Since, like the mobile communication terminals, such in-vehicle devices manage the personal information with address books etc. and generate the outgoing-call and incoming-call historical information and the Web historical information, the user-friendliness and the convenience are ensured in the in-vehicle devices.

A mobile telephone storing a variety of additional information, in addition to general outgoing-call and incoming-call historical information, such as telephone numbers and sending and receiving times of day, is disclosed in Japanese Unexamined Patent Application Publication No. 2000-184044 (Patent Document 1). The mobile telephone disclosed in Patent Document 1 simultaneously displays information including the presence of a call, the presence of a voice mail, the presence of a conversation record, and the presence of a recorded memo on the basis of the variety additional information, when the outgoing-call history or the incoming-call history is displayed. With this mobile telephone, it is possible for a user to easily remember matters by the presence of a dialing without a speech or by reproducing the recorded memo in the retrieval of the outgoing-call history or the incoming-call history.

However, since the mobile telephone disclosed in Patent Document 1 stores the above additional information as the outgoing-call and incoming-call historical information, the additional information can be indicated only in the retrieval of the outgoing-call history and incoming-call history. Although information concerning an in-vehicle device, acquired on the basis of the usage of the mobile telephone used for communication by the in-vehicle device, can be useful for the user, no care is directed to the use of such information in the mobile telephone disclosed in Patent Document 1. In addition, since the mobile telephone disclosed in Patent Document 1 only displays the additional information in a display unit of the mobile telephone, which is caused by the fact that no care is directed to the use of the mobile telephone for the communication by the in-vehicle device, it is necessary for a user to confirm the information with the mobile telephone in his hand and, therefore, the mobile telephone disclosed in Patent Document 1 is not desirable in view of ensuring the safety while the user drives the vehicle.

BRIEF SUMMARY

It is desirable to provide an information addition system capable of associating a variety of information as additional information with personal information relating to communication by an electronic device using a mobile communication terminal to indicate to a user the information useful for the user in various timings and modes and to provide the mobile communication terminal having the personal information and the additional information.

According to one embodiment of the present disclosure, there is provided an information addition system that acquires data and a control signal from a hands-free apparatus and a navigation apparatus. The hands-free apparatus is connected to a mobile communication terminal so as to be capable of data communication and includes an address-book data storage unit that associates communication-partner information indicating a communication partner of the mobile communication terminal with name information corresponding to the communication-partner information and stores the associated information in a personal information database as first personal information. The navigation apparatus includes a position detecting unit detecting a current position and is capable of setting a destination. The information addition system includes an additional information acquiring unit that acquires date and time information indicating a date and time when the mobile communication terminal transmits an outgoing call or receives an incoming call from the navigation apparatus as first additional information and that acquires predetermined information at the outgoing call or the incoming call as second additional information, and an information adding unit that identifies the first personal information corresponding to the communication partner at the outgoing call or the incoming call, in the personal information database, on the basis of the communication-partner information indicating the communication partner at the outgoing call or incoming call and that associates the first and second additional information, acquired by the additional information acquiring unit, with the identified first personal information and stores the first and second additional information associated with the first personal information.

With this structure, the first and second additional information can be associated with the first personal information managed by the hands-free apparatus connected to the mobile communication terminal. In addition, the association of the first and second additional information with the first personal information allows the content of data on the basis of the first and second additional information to be indicated not only in the case where the outgoing-call or incoming-call history is referred to in the in-vehicle system including the hands-free apparatus but also in various timings and modes.

The first personal information may be generated on the basis of data stored in a storage unit in the mobile communication terminal. In this case, the first personal information can be generated without newly registering the personal information. Data indicating names, telephone numbers, e-mail addresses, etc. that is registered in the address book in the mobile communication terminal is stored in the storage unit in the mobile communication terminal.

The predetermined information at the outgoing call or incoming call may be place-name information corresponding to the current position detected by the navigation apparatus at the outgoing call or incoming call and destination information set in the navigation apparatus. In this case, the place-name information and the destination information can be acquired as the second additional information.

The communication-partner information may be data indicating at least one of a telephone number and an e-mail address. In this case, the communication-partner information may be either the information indicating the telephone number or the information indicating the e-mail address or may be both the information indicating the telephone number and the information indicating the e-mail address.

The information addition system may further acquire data and a control signal from an audio apparatus including a voice recording unit that records a voice input through a microphone and from an operating unit capable of outputting the control signal. The voice recording unit may record the voice input through the microphone as first voice-memo information, when the voice recording unit acquires the control signal on the basis of a predetermined input operation from the operating unit after the communication with the mobile communication terminal at the outgoing call or incoming call is terminated. The additional information acquiring unit may acquire the first voice-memo information recorded by the voice recording unit as third additional information, and the information adding unit may associate the third additional information with the identified first personal information and may store the third additional information associated with the first personal information. In this case, the first voice-memo information can be associated with the first personal information as the third additional information.

The mobile communication terminal may be a mobile telephone. The hands-free apparatus may include an answering-machine determining unit that determines whether the communication partner at the outgoing call is an answering machine and an answering-machine information generating unit that generates answering machine information indicating that the communication partner is an answering machine if the answering-machine determining unit determines that the communication partner is an answering machine. The additional information acquiring unit may acquire the answering machine information generated by the answering-machine information generating unit as fourth additional information, and the information adding unit may associate the fourth additional information with the identified first personal information and may store the fourth additional information associated with the first personal information. In this case, the answering machine information can be associated with the first personal information as the fourth additional information.

The mobile communication terminal may be a mobile telephone. The hands-free apparatus may include a response determining unit that determines whether the communication partner at the outgoing call responds or whether the mobile telephone responds at the incoming call and a speech-information generating unit that generates speech information if the response determining unit determines that the communication partner or the mobile telephone responds and generates non-speech information if the response determining unit determines that the communication partner or the mobile telephone does not respond. The additional information acquiring unit may acquire the speech information or the non-speech information as fifth additional information, and the information adding unit may associate the fifth additional information with the identified first personal information and may store the fifth additional information associated with the first personal information. In this case, the speech information or the non-speech information can be associated with the first personal information as the fifth additional information.

The information addition system may further acquire data and a control signal from an operating unit capable of outputting the control signal. The hands-free apparatus may include an address-book data outputting unit that displays the content of data on the basis of address book information including the first personal information stored in the personal information database. If a first control signal on the basis of a predetermined input operation is acquired from the operating unit while the address-book data outputting unit displays the content of the data, the additional information acquiring unit may acquire predetermined image data as sixth additional information if the additional information acquiring unit further acquires a second control signal on the basis of a predetermined input operation for selecting an image from the operating unit, and the information adding unit may associate the sixth additional information with the first personal information corresponding to the content of data displayed in the address-book data outputting unit when the first control signal is acquired and may store the sixth additional information associated with the first personal information. In this case, for example, the facial portrait of a person registered in the address book can be associated with the first personal information as the sixth additional information.

The information addition system may further acquire data and a control signal from an audio apparatus including a voice recording unit that records a voice input through a microphone and an operating unit capable of outputting the control signal. The hands-free apparatus may include a historical information outputting unit that displays the content of data on the basis of outgoing-call or incoming-call historical information including the first personal information and the first additional information. The voice recording unit may record the voice input through the microphone as second voice-memo information, when the voice recording unit acquires the control signal on the basis of a predetermined input operation from the operating unit while the content of the data is displayed. The additional information acquiring unit may acquire the second voice-memo information recorded by the voice recording unit as seventh additional information, and the information adding unit may associate the seventh additional information with the first personal information corresponding to the content of the data displayed in the historical information outputting unit when the control signal is acquired and may store the seventh additional information associated with the first personal information. In this case, the second voice-memo information can be associated with the first personal information as the seventh additional information when the outgoing-call or incoming-call history is referred to.

The information addition system may further include a first information indicating unit that outputs by voice the content of data on the basis of the additional information. In this case, it is possible to indicate by voice the content of data on the basis of the additional information in various timings. The use of voice allows the preferable indication without endangering the safety while the user drives the vehicle.

When the mobile communication terminal transmits the outgoing call, the first information indicating unit may output by voice the content of data on the basis of the additional information associated with the first personal information identified by the information adding unit when the mobile communication terminal transmits the outgoing call. In this case, the content of data on the basis of the additional information can be output by voice, for example, when the mobile communication terminal transmits the outgoing call.

When the mobile communication terminal receives the incoming call, the first information indicating unit may output by voice the content of data on the basis of the additional information associated with the first personal information identified by the information adding unit when the mobile communication terminal receives the incoming call. In this case, the content of data on the basis of the additional information can be output by voice, for example, when the mobile communication terminal receives the incoming call.

The mobile communication terminal may be a mobile telephone. When the answering is held on the mobile telephone, the first information indicating unit may output by voice the content of data on the basis of the additional information associated with the first personal information identified by the information adding unit when the mobile telephone receives the incoming call. In this case, for example, when the answering is held, the content of data on the basis of the additional information can be output by voice.

The mobile communication terminal may be a mobile telephone. When the call is placed on hold on the mobile telephone, the first information indicating unit may output by voice the content of data on the basis of the additional information associated with the first personal information identified by the information adding unit when the mobile telephone transmits the outgoing call or receives the incoming call. In this case, for example, when the user or the communication partner places the call on hold, the content of data on the basis of the additional information can be output by voice.

The mobile communication terminal may be a mobile telephone. The hands-free apparatus may have, as the reception settings, a manual response mode in which the hands-free unit does not allow automatic response to the mobile telephone and an automatic response mode in which the hands-free unit allows automatic response to the mobile telephone. When the mobile telephone receives the incoming call, the first information indicating unit may not allow the hands-free apparatus to automatically respond to the mobile telephone until the first information indicating unit terminates the output by voice of the content of data on the basis of the additional information associated with the first personal information identified by the information adding unit when the mobile telephone receives the incoming call with the reception setting being set to the automatic response mode. In this case, for example, when the automatic response mode is set, the content of data on the basis of the additional information can be output by voice before the first information indicating unit allows the hands-free apparatus to automatically respond to the mobile telephone.

The information addition system may further acquire data and a control signal from an operating unit capable of outputting the control signal. The hands-free apparatus may include an address-book data outputting unit that displays the content of data on the basis of address book information including the first personal information stored in the personal information database. If the control signal on the basis of a predetermined input operation is acquired from the operating unit while the content of the data is displayed, the first information indicating unit may output by voice the content of data on the basis of the additional information associated with the first personal information corresponding to the content of the data displayed when the control signal is acquired. In this case, the content of data on the basis of the additional information can be output by voice, for example, when the user refers to the address book.

The information addition system may further acquire data and a control signal from an operating unit capable of outputting the control signal. The hands-free apparatus may include a historical information outputting unit that displays the content of data on the basis of outgoing-call or incoming-call historical information including the first personal information and the first additional information. If the control signal on the basis of a predetermined input operation is acquired from the operating unit while the content of the data is displayed, the first information indicating unit may output by voice the content of data on the basis of the additional information associated with the first personal information corresponding to the content of the data displayed when the control signal is acquired. In this case, the content of data on the basis of the additional information can be output by voice, for example, when the user refers to the outgoing-call or incoming-call history.

The first information indicating unit may display the content of the data, instead of outputting by voice the content of the data. In this case, it is possible to indicate to the user the content of data on the basis of the additional information in the display mode.

The navigation apparatus may have a browser function. The additional information acquiring unit may acquire URL information indicating a specified URL from the navigation apparatus as second personal information. The information adding unit may store the second personal information. In this case, it is possible to associate the additional information with the second personal information, which is the URL information.

The additional information acquiring unit may acquire the second personal information from the navigation apparatus and may acquire a date and time when the URL is specified as eighth additional information. The information adding unit may associate the eighth additional information with the second personal information for every date and time that is specified and may store the eighth additional information associated with the second personal information. In this case, it is possible to associate the date and time when the URL is specified with the second personal information as the eighth additional information. It is also possible to give a factor of history to the second personal information by storing the eighth additional information for every date and time that is specified.

The navigation apparatus may include a Web page update determining unit that determines whether the URL of a Web page that is accessed coincides with the URL indicated by the second personal information and whether, if the URL of the accessed Web page coincides with the URL indicated by the second personal information, the accessed Web page is updated, and a Web page update information generating unit that generates an update date and time of the Web page as Web page update information if the Web page update determining unit determines that the Web page is updated. The additional information acquiring unit may acquire the Web page update information from the navigation apparatus as ninth additional information. The information adding unit may associate the ninth additional information with the second personal information indicating the URL of the Web page that is determined to be updated by the Web page update determining unit for every update date and time and may store the ninth additional information associated with the second personal information. In this case, it is possible to associate the Web page update information with the second personal information as the ninth additional information. It is also possible to calculate an interval of the update date and time of the Web page corresponding to the second personal information by storing the ninth additional information for every update date and time.

The information addition system may further include a second information indicating unit that outputs by voice the content of data on the basis of the additional information. In this case, the content of data on the basis of the additional information can be output by voice in various timings. The use of voice allows the preferable indication without endangering the safety while the user drives the vehicle.

The information addition system may further acquire data and a control signal from an operating unit capable of outputting the control signal. The navigation apparatus may include a Web historical information outputting unit that displays Web historical information including the content of data on the basis of the second personal information. If the control signal on the basis of a predetermined input operation is not acquired from the operating unit for a predetermined time period while the content of the data is displayed, the second information indicating unit may output by voice the content of data on the basis of the additional information associated with the second personal information corresponding to the content of the data displayed when the control signal is not acquired for the predetermined time period. In this case, the content of data on the basis of the additional information can be output by voice if the control signal is not acquired from the operating unit for a predetermined time period, for example, while the user refers to the Web history.

The information addition system may further acquire data and a control signal from an operating unit capable of outputting the control signal. The navigation apparatus may include a Web historical information outputting unit that displays the content of data on the basis of the second personal information as Web historical information. If the control signal on the basis of a predetermined input operation is acquired from the operating unit while the content of the data is displayed, the second information indicating unit may output by voice the content of data on the basis of the additional information associated with the second personal information corresponding to the content of the data displayed when the control signal is acquired. In this case, the content of data on the basis of the additional information can be output by voice if the control signal on the basis of a predetermined input operation is acquired from the operating unit, for example, while the user refers to the Web history.

The second information indicating unit may display the content of data, instead of outputting by voice the content of the data. In this case, it is possible to indicate to the user the content of data on the basis of the additional information in the display mode.

The information addition system may further include an access-date-and-time calculating unit that calculates a date and time when the Web page having the URL indicated by the second personal information is accessed on the basis of the eighth additional information associated with the second personal information and a first access-guide-information generating unit that generates information directing an access to the Web page whose access date and time is calculated by the access-date-and-time calculating unit as first access guide information. In this case, the first access guide information can be used to direct the user to access the Web page whose access date and time is calculated in various modes and timings. This structure intends to indicate to the user the useful information relating to the second personal information by the use of the additional information. The additional information can be used in the above manner, instead of indicating the content of data on the basis of the additional information.

On the access date and time calculated by the access-date-and-time calculating unit, the second information indicating unit may output by voice the first access guide information. In this case, the first access guide information can be output by voice, for example, on the access date and time that is calculated.

The information addition system may further include an update-date-and-time calculating unit that calculates a date and time when the Web page having the URL indicated by the second personal information is updated, on the basis of the interval of the update date and time indicated by ninth additional information associated with the second personal information and a second access-guide-information generating unit that generates information directing an access to the Web page whose update date and time is calculated by the update-date-and-time calculating unit as second access guide information. In this case, the second access guide information can be used to direct the user to access the Web page determined to be updated in various modes and timings. This structure intends to indicate to the user the useful information relating to the second personal information by the use of the additional information.

On the update date and time calculated by the update-date-and-time calculating unit, the second information indicating unit may output by voice the second access guide information. In this case, the second access guide information can be output by voice, for example, on the update date and time that is calculated.

The information adding unit may store the additional information in a storage device. In this case, the additional information can be stored in, for example, the storage device.

The information adding unit may store the additional information, along with the first or second personal information with which the additional information is associated, in a storage unit in the mobile communication terminal. In this case, the mobile communication terminal can independently use the additional information.

According to another embodiment of the present disclosure, there is provided a mobile terminal including a storage unit that stores the additional information and the first personal information with which the additional information is associated. With this structure, even when the mobile communication terminal is independently used, the additional information stored in the storage unit can be used in the same manner as in the in-vehicle system described above.

According to yet another embodiment of the present disclosure, there is provided a method of adding information, for acquiring data and a control signal from a hands-free apparatus and a navigation apparatus. The hands-free apparatus is connected to a mobile communication terminal so as to be capable of data communication, associates communication-partner information indicating a communication partner of the mobile communication terminal with name information corresponding to the communication-partner information, and stores the associated information in a personal information database as first personal information. The navigation apparatus detects a current position and is capable of setting a destination. The method includes the steps of acquiring date and time information indicating a date and time when the mobile communication terminal transmits an outgoing call or receives an incoming call from the navigation apparatus as first additional information and acquiring predetermined information at the outgoing call or the incoming call as second additional information; and identifying the first personal information corresponding to the communication partner at the outgoing call or the incoming call, in the personal information database, on the basis of the communication-partner information indicating the communication partner at the outgoing call or incoming call, associating the first and second additional information with the identified first personal information, and storing the first and second additional information associated with the first personal information.

According to the present disclosure, it is possible to provide an information addition system capable of associating a variety of information as additional information with personal information relating to communication by an electronic device using a mobile communication terminal to indicate to a user the information useful for the user in various timings and modes and to provide the mobile communication terminal having the personal information and the additional information.

BRIEF DESCRIPTION OF THE DRAWINGS

FIG. 13 shows an exemplary process in which the information addition system indicates the additional information by voice or displays the additional information when an outgoing-call history is referred to;

FIG. 14 shows an exemplary process in which the information addition system indicates the additional information by voice or displays the additional information when an incoming-call history is referred to;

FIG. 15 shows an exemplary process in which the information addition system indicates the additional information by voice or displays the additional information when a mail history is referred to;

DETAILED DESCRIPTION OF THE DRAWINGS

Figure 1:
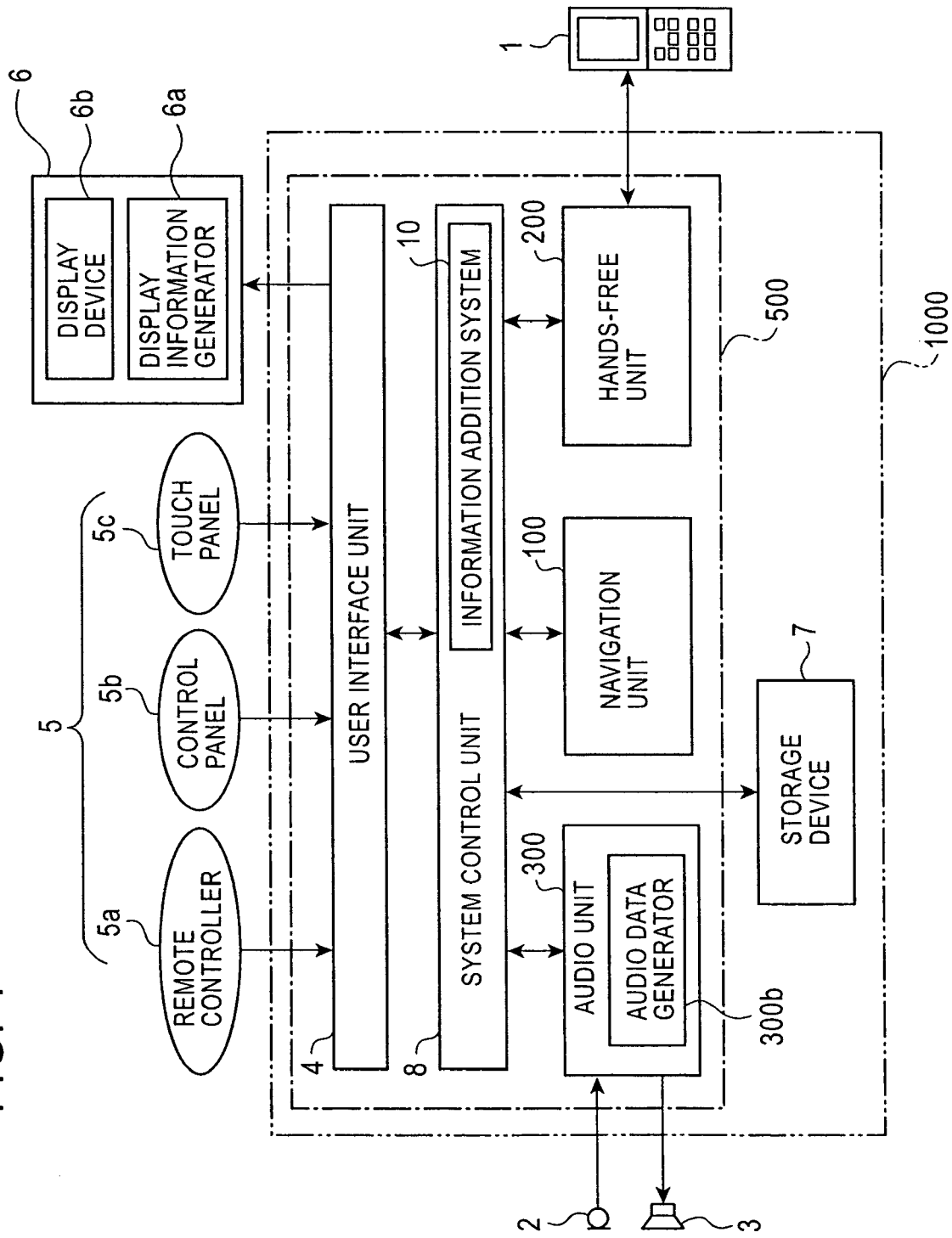
FIG. 1 shows an example of one embodiment of a structure of an in-vehicle system including an information addition system.

FIG. 1 shows an example of one embodiment of a structure of an in-vehicle system 1000 including an information addition system 10. According to this embodiment, the information addition system 10 is included in a system control unit 8 in the in-vehicle system 1000. The system control unit 8 performs path control of data and control signals transferred among a navigation unit (a navigation apparatus) 100, a hands-free unit (a hands-free apparatus) 200, an audio unit (an audio apparatus) 300, and a user interface unit 4. The information addition system 10 is an arithmetic processing unit, such as a microcomputer or a central processing unit (CPU), and includes programs used for performing the path control of the data and the control signals. In accordance with the programs, the information addition system 10 relays a voice signal input through a microphone 2 connected to the audio unit 300 to the navigation unit 100 or the hands-free unit 200 via the audio unit 300, relays a voice signal transmitted from a communication partner of a mobile telephone 1 connected to the hands-free unit 200 to the audio unit 300 via the hands-free unit 200, relays the control signal supplied from the user interface unit 4, described below, to the navigation unit 100, the hands-free unit 200, or the audio unit 300, and relays a predetermined output signal from the navigation unit 100, the hands-free unit 200, or the audio unit 300 to the user interface unit 4. The information addition system 10 performs a variety of processing in accordance with the included programs and also functions as various control means. The various control means and the variety of processing performed by the information addition system 10 will be described below.

The navigation unit 100, the hands-free unit 200, and the audio unit 300 are capable of exchanging the data and the control signals with each other via the system control unit 8. Accordingly, a controller 100a, a controller 200a, or a controller 300a, described below, can function as the various control means, instead of the information addition system 10. For example, when the controller 200a in the hands-free unit 200 functions as the various control means instead of the information addition system 10, "performing a process acquired from the hands-free unit 200" means "performing the process acquired from the hands-free unit 200 itself", and "performing a process supplied to the hands-free unit 200" means "performing the process supplied from the hands-free unit 200". That is, the information addition system 10 can be appropriately replaced with the controller 100a, the controller 200a, or the controller 300a depending on the structure of the in-vehicle system 1000. In other words, the case where the information addition system 10 functions as the various control means is practically the same as the case where the controller 100*a*, the controller 200*a*, or the controller 300*a* functions as the various control means.

The navigation unit 100 receives the current position where the vehicle is running from an artificial satellite and displays the current position of the vehicle, along with a road map, in a display device 6*b* described below to guide a user. The controller 100*a* (not shown) in the navigation unit 100 includes a program for navigation. The controller 100*a* performs a process of detecting the current position of the vehicle on the basis of a signal supplied from a global positioning system (GPS) receiving section and an autonomous navigation sensor, which are not shown, in accordance with the included program to function as position detecting means. The controller 100*a* is an arithmetic processing unit, such as a microcomputer or a CPU. The GPS receiving section receives a GPS signal transmitted from a GPS satellite to detect the latitude and longitude of the current position of the vehicle. The autonomous navigation sensor detects the traveling direction and the speed of the vehicle.

A user can set a destination for the navigation unit 100 by performing a predetermined input operation with an operating unit 5 described below. In this case, the controller 100*a* retrieves one or more guide paths that satisfy search conditions including the set destination by the use of the map data etc. in accordance with the program for navigation. The navigation unit 100 includes a communication modem (not shown). The communication modem establishes a two-way communication link between an Internet browser and an Internet service provider (ISP) connected to the Internet. In other words, the navigation unit 100 has a browser function and the establishment of the two-way communication link by the communication modem in the navigation unit 100 allows the user to browse a Web on the Internet with the display device 6*b* described below. In addition, the navigation unit 100 has a calendar and clock function. The information addition system 10, the hands-free unit 200, and the audio unit 300 can share date and time information calculated on the basis of the calendar and clock function with each other. However, the date and time information may be acquired from, for example, the mobile telephone 1.

The hands-free unit 200 transmits a control signal to the mobile telephone 1, instead of an operating unit 16, described below, included in the mobile telephone 1 that is connected to the hands-free unit 200 so as to be capable of data communication with the hands-free unit 200. The controller 200*a* (not shown) in the hands-free unit 200 includes various programs to perform a variety of processing in accordance with the included programs and functions as the various control means. The various control means and the variety of processing performed by the controller 200*a* will be described below. The controller 200*a* is an arithmetic processing unit, such as a microcomputer or a CPU. Specifically, the controller 200*a* converts input voice data supplied from the microphone 2 into the control signal to be supplied to the mobile telephone 1 in accordance with the included programs by the use of a voice recognition dictionary indicating the correspondence between the input voice data and the control signal and transmits the control signal to the mobile telephone 1. However, if the control signal is supplied from the operating unit 5, the controller 200*a* may directly supply the control signal to the mobile telephone 1. The operating unit 5 in this case corresponds to buttons on the steering wheel of the vehicle, with which the user can drive the vehicle without releasing both hands from the steering wheel.

The audio unit 300 includes an audio device, a television tuner, a radio tuner, and so on used for audio reproduction and audio output. The controller 300*a* (not shown) in the audio unit 300 includes programs used for recording a voice input through the microphone 2 and performs processing in accordance with the included programs to function as voice recording means. The controller 300*a* is an arithmetic processing unit, such as a microcomputer or a CPU. An audio data generator 300*b* in the audio unit 300 generates audio data on the basis of additional information described below and supplies the generated audio data to a speaker 3. However, if the additional information is the audio data, such as a recorded memo, the audio data generator 300*b* may directly supply the audio data to the speaker 3. The audio unit 300 may simultaneously control both a sound source emitting a sound to be reproduced by the audio unit 300 and a sound source on the basis of a predetermined output from the navigation unit 100 or the hands-free unit 200.

The user interface unit 4 interfaces the operating unit 5, which is used by the user who inputs information, and a screen control unit 6, which displays information for the user, with an internal bus of the information addition system 10. The operating unit 5 supplies the audio data and the control signal to the navigation unit 100, the hands-free unit 200, and the audio unit 300. The operating unit 5 may include, for example, a remote controller 5*a*, a control panel 5*b*, a touch panel 5*c* integrated with the display device 6*b* described below. In addition, the operating unit 5 may include a microphone used for receiving a voice. In this case, the microphone 2 may be used as the operating unit 5.

The screen control unit 6 generates display information on the basis of predetermined output signals supplied from the navigation unit 100, the hands-free unit 200, and the audio unit 300 and displays the generated display information. The screen control unit 6 can generate the display information on the basis of the additional information described below and display the generated display information. Specifically, the screen control unit 6 includes a display information generator 6*a* generating the display information and the display device 6*b* in which the display information generated by the display information generator 6*a* is displayed. A storage device 7 is a component in which a map database used by the navigation unit 100, the voice recognition dictionary used by the hands-free unit 200, music data to be reproduced by the audio unit 300, a personal information database, the additional information, which are described below, etc. are stored. For example, the storage device 7 is applicable to a hard disk. The ranges indicated by dot-dashed lines in FIG. 1 define a calculation apparatus 500 and the in-vehicle system 1000.

The personal information database includes first personal information in which communication-partner information indicating a communication partner is associated with name information corresponding to the communication-partner information. According to this embodiment of the present disclosure, the communication-partner information is telephone-number data indicating a telephone number. The personal information database is managed by the hands-free unit 200, which registers, changes, or deletes the first personal information. These processes are performed by the controller 200*a* functioning as address-book data storing means. However, the personal information database can also be used in the information addition system 10 and the navigation unit 100. The personal information database may be generated on the basis of personal information stored in a storage unit 15, described below, in the mobile telephone 1. Specifically, for example, the telephone-number data and the name information are acquired from information concerning the address book in the mobile telephone 1 and a conversion process for unifying the data format is performed to generate the personal information database. In this case, the personal information database can be generated without newly registering the personal information. The personal information in the mobile telephone 1 may be directly used, if applicable. In addition, information concerning an address, in addition to the name information, may be associated with the communication-partner information to generate the first personal information.

Figure 2:
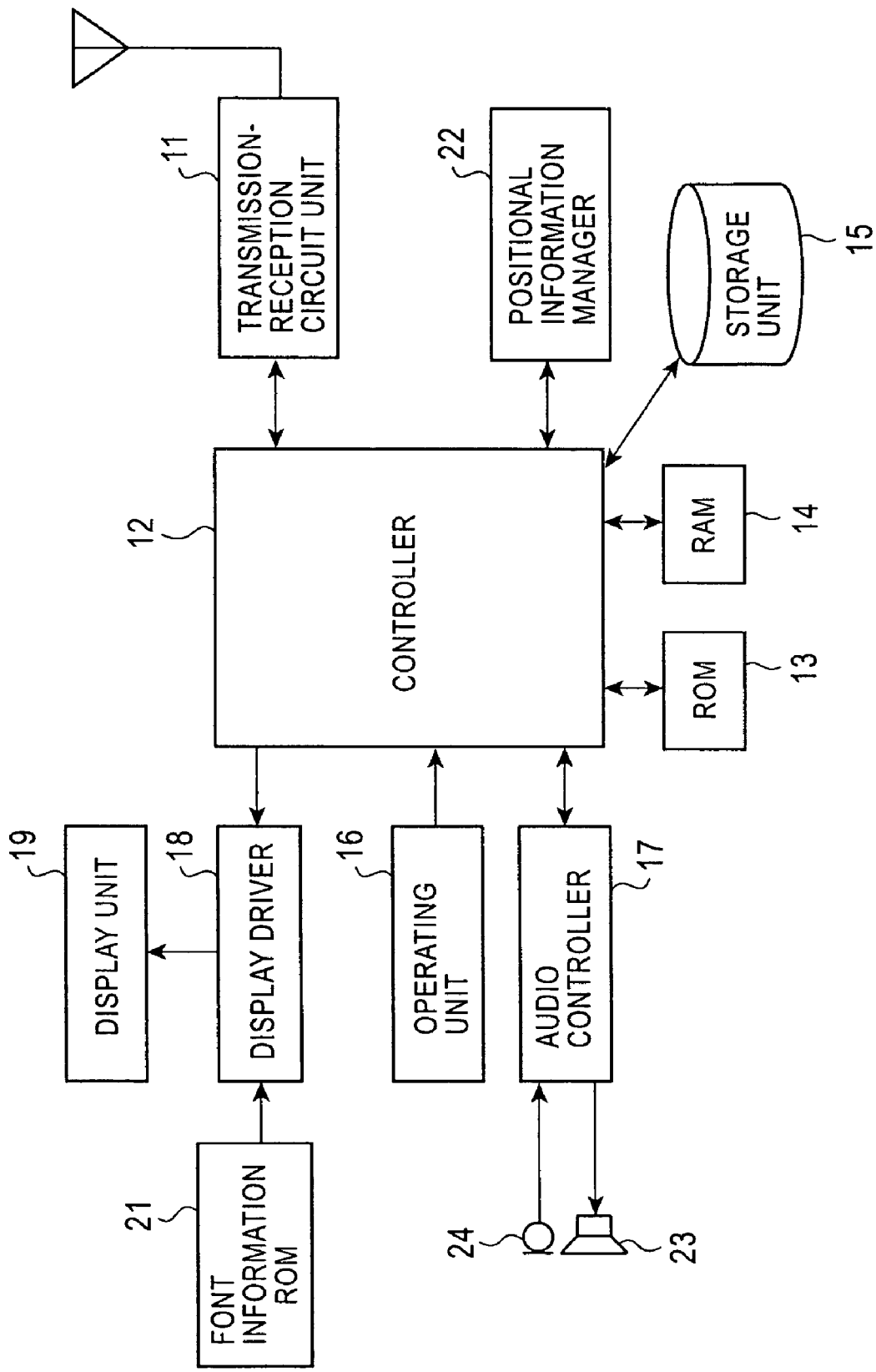
FIG. 2 shows one example of a structure of a mobile telephone.

FIG. 2 shows an example of a structure of the mobile telephone 1. A transmission-reception circuit unit 11 to which an antenna is connected performs transmission and reception in the mobile telephone 1 under the control of a controller 12. Specifically, the transmission-reception circuit unit 11 performs high-frequency modulation to the voice message, the display information, or the control signal to transmit the modulated signal through the antenna and demodulates the voice message, the display information, or the control signal that is received to supply the demodulated signal to the controller 12. The controller 12 operates in response to the control signals supplied from the operating unit 16, the transmission-reception circuit unit 11, and the hands-free unit 200 in accordance with the programs described in a read only memory (ROM) 13 and controls the transmission-reception circuit unit 11, a display driver 18, and an audio controller 17 to perform call processing in voice communication. The controller 12 is connected to a random access memory (RAM) 14 to use the RAM 14 as a working area used for executing the program described in the ROM 13. The controller 12 is also connected to the storage unit 15 to store outgoing-call historical information, incoming-call historical information, and image data in the storage unit 15.

The controller 12 controls the display driver 18 to display the outgoing-call historical information and the incoming-call historical information in a display unit 19. The display driver 18 reads out a character pattern etc. corresponding to the control signal supplied from the controller 12 from a font information ROM 21 and displays the readout character patter etc. in the display unit 19. The operating unit 16 includes function selection keys with which power-on, a response to an outgoing call or an incoming call (on-hook and off-hook states), selection of a function, and various setups are performed and a numeric keypad used by the user for inputting a telephone number at an outgoing call and registering the telephone number and the name in the address book. The audio controller 17 is connected to a speaker 23 and a microphone 24. The audio controller 17 amplifies the voice signal supplied from the controller 12 to output the amplified signal through the speaker 23 and amplifies the voice signal received through the microphone 24 to supply the amplified signal to the controller 12. A positional information manager 22 manages information concerning the current position, like the navigation unit 100 described above, and manages information delivered from a base station. However, unlike the navigation unit 100, the positional information manager 22 only identifies a simple position.

Exemplary processes of associating a variety of information with the first personal information as the additional information will be described. The processes are performed by the information addition system 10 in the structure described above. For simplicity, a process performed by the controller 12 is referred to as a process performed by the mobile telephone 1, a process performed by the controller 100*a* is referred to as a process performed by the navigation unit 100, a process performed by the microphone controller 200*a* is referred to as a process performed by the hands-free unit 200, and a process performed by the controller 300*a* is referred to as a process performed by the audio unit 300. First, an exemplary process of associating first and second additional information with the first personal information, performed by the information addition system 10, will be described.

When a user performs a predetermined input operation with the operating unit 5 in order to make a call, the information addition system 10 receives an outgoing signal from the operating unit 5 and supplies the received outgoing signal to the hands-free unit 200. Accordingly, the information addition system 10 can detect that the mobile telephone 1 transmits the outgoing call. When the mobile telephone 1 receives a call, the mobile telephone 1 supplies an incoming signal to the hands-free unit 200. The hands-free unit 200, which has received the incoming signal, detects that the mobile telephone 1 has received the call and supplies the incoming signal to the information addition system 10. Accordingly, the information addition system 10 can detect that the mobile telephone 1 receives the call.

The hands-free unit 200, which has received the outgoing signal or the incoming signal, identifies the communication partner of the mobile telephone 1 at the outgoing call or the incoming call on the basis of the telephone-number data (communication-partner information). For example, the hands-free unit 200 acquires the telephone-number data from the mobile telephone 1 to identify the communication partner on the basis of the acquired telephone-number data. However, for example, in order to unify the data format, data generated on the basis of the acquired telephone-number data may be used as the telephone-number data. After identifying the communication partner at the outgoing call or the incoming call on the basis of telephone-number data, the hands-free unit 200 supplies the telephone-number data to the information addition system 10.

The information addition system 10, which has acquired the telephone-number data, identifies the first personal information, corresponding to the telephone-number data, in the personal information database stored in the storage device 7. In contrast, the information addition system 10, which has received the outgoing signal or the incoming signal, performs a process of acquiring date and time information indicating a date and time at the outgoing call or the incoming call from the navigation unit 100 as first additional information. Similarly, the information addition system 10 performs a process of acquiring place-name information corresponding to the current position detected by the navigation unit 100 at the outgoing signal or the incoming signal and destination information that is set, from the navigation unit 100 as second additional information. In other words, the information addition system 10 performs the processes of acquiring the first additional information and the second additional information to function as additional information acquiring means. The information addition system 10 also performs a process of associating the first and second additional information with the acquired first personal information and storing the first and second additional information associated with the first personal information. In other words, the information addition system 10 performs the above process to function as information adding means. The information addition system 10 realizes the association of the first and second additional information with the first personal information in the manner described above.

The information addition system 10 can associate a variety of information described below with the first personal information as the additional information. First, an exemplary process of associating first voice-memo information with the first personal information as third additional information, performed by the information addition system 10, will now be described in detail. In this process, when the audio unit 300 acquires a control signal on the basis of a predetermined input operation with the operating unit 5 after the communication by the mobile telephone 1 at the outgoing call or the incoming call is finished, the audio unit 300 records a voice input through the microphone 2 as the first voice-memo information. Since the mobile telephone 1 supplies a disconnection signal to the hands-free unit 200 after the communication by the mobile telephone 1 is finished, the hands-free unit 200 detects that the communication is finished on the basis of the received disconnection signal. After the first voice-memo information is generated, the audio unit 300 supplies a recording termination signal to the information addition system 10. The information addition system 10, which has received the recording termination signal from the audio unit 300, performs a process of acquiring the first voice-memo information from the audio unit 300. The information addition system 10 can directly acquire the first voice-memo information from the audio unit 300. However, when the audio unit 300 stores the generated first voice-memo information in the storage device 7, the information addition system 10 may acquire the first voice-memo information from the storage device 7. The information addition system 10, which has acquired the first voice-memo information, associates the first voice-memo information with the first personal information as the third additional information and stores the third additional information associated with the first personal information. The information addition system 10 realizes the association of the third additional information with the first personal information in the manner described above.

Next, an exemplary process of associating answering machine information with the first personal information as fourth additional information, performed by the information addition system 10, will now be described in detail. The controller 200a in the hands-free unit 200 functions as answering-machine determining means for determining whether the communication partner at the outgoing call is an answering machine and answering-machine information generating means for, if the answering-machine determining means determines that the communication partner is an answering machine, generating the answering machine information indicating that the communication partner is an answering machine. The hands-free unit 200 determines whether the communication partner is an answering machine by detecting a dial tone submitted from the answering machine that starts recording. The hands-free unit 200 supplies a signal to the information addition system 10 after the hands-free unit 200 generates the answering machine information. The information addition system 10 performs a process of acquiring the answering machine information in response to the signal supplied from the hands-free unit 200. The information addition system 10 also performs a process of associating the answering machine information with the first personal information as the fourth additional information and storing the fourth additional information associated with the first personal information. The information addition system 10 realizes the association of the fourth additional information with the first personal information in the manner described above.

Next, an exemplary process of associating speech information indicating that a speech is completed or non-speech information indicating that a speech is not completed with the first personal information as fifth additional information, performed by the information addition system 10, will now be described in detail. In this case, the controller 200a in the hands-free unit 200 functions as response determining means for determining whether the communication partner responds at the outgoing call or whether the mobile telephone 1 responds at the incoming call and as speech-information generating means for generating the speech information if the response determining means determines that the communication partner or the mobile telephone 1 responds and generating the non-speech information if the response determining means determines that the communication partner or the mobile telephone 1 does not respond. The hands-free unit 200 determines that the mobile telephone 1 responds on the basis of reception of a response signal supplied from the mobile telephone 1 when the mobile telephone 1 responds. The hands-free unit 200 determines that the mobile telephone 1 does not respond on the basis of reception of the disconnection signal supplied from the mobile telephone 1 when the communication is disconnected, without receiving the response signal. After the hands-free unit 200 generates the speech information or the non-speech information, the hands-free unit 200 supplies a signal to the information addition system 10. The information addition system 10 performs a process of acquiring the speech information or the non-speech information on the basis of the signal supplied from the hands-free unit 200. In addition, the information addition system 10 performs a process of associating the speech information or the non-speech information with the first personal information as the fifth additional information and storing the fifth additional information associated with the first personal information. The information addition system 10 realizes the association of the fifth additional information with the first personal information in the manner described above.

When a user inputs a predetermined control signal with the operating unit 5 while referring to the address book, the information addition system 10 may associate the additional information with the first personal information. Next, an exemplary process of associating image data with the first personal information as sixth additional information, performed by the information addition system 10, will now be described in detail. In this case, the controller 200a in the hands-free unit 200 functions as address-book data outputting means for displaying the content of data on the basis of address book information including the first personal information stored in the personal information database in the display device 6b in the form of the address book. The content of data on the basis of the first personal information is a name, a telephone number, or an e-mail address in this embodiment of the present disclosure.

If the user depresses, for example, a "facial portrait" on the touch panel 5c, which corresponds to the content of the data and which has not been registered, while the hands-free unit 200 displays the content of the data in the display device 6b, the operating unit 5 supplies a first control signal to the hands-free unit 200. The hands-free unit 200, which has received the first control signal, acquires the image data from the mobile telephone 1 to display the acquired image data in the display device 6b. The user depresses the "image" (the facial portrait) on the touch panel 5c, corresponding to the displayed content of the data, in the image displayed in the display device 6b. In other words, the depression of the "image" causes the operating unit 5 to supply a second control signal to the hands-free unit 200.

The information addition system 10, which has received the second control signal, performs a process of acquiring the image data corresponding to the depressed "image" from the hands-free unit 200 as the sixth additional information. In addition, the information addition system 10 performs a process of associating the sixth additional information with the first personal information corresponding to the content of the data displayed in the address book and storing the sixth additional information associated with the first personal information. The information addition system 10 realizes the association of the sixth additional information with the first personal information in the manner described above while the user refers to the address book.

When a user inputs a predetermined control signal with the operating unit 5 while referring to the outgoing-call or incoming-call history, the information addition system 10 may associate the additional information with the first personal information. Next, an exemplary process of associating second voice-memo information with the first personal information as seventh additional information, performed by the information addition system 10, will now be described in detail. In this case, the controller 200a in the hands-free unit 200 functions as historical information outputting means for displaying the content of data on the basis of the outgoing-call or incoming-call historical information including the first personal information and the first additional information.

If the user depresses, for example, "Recording" with the operating unit 5 while the hands-free unit 200 displays the outgoing-call or incoming-call historical information in the display device 6b, the operating unit 5 supplies a recording signal to the audio unit 300. The audio unit 300, which has received the recording signal, performs a process of recording a voice input through the microphone 2 as the second voice-memo information. After the second voice-memo information is generated, the audio unit 300 supplies a signal to the information addition system 10. The information addition system 10 acquires the second voice-memo information as the seventh additional information on the basis of the signal supplied from the audio unit 300. In addition, the information addition system 10 performs a process of associating the seventh additional information with the first personal information corresponding to the content of data displayed by the hands-free unit 200 when the "Recording" is depressed, and storing the seventh additional information associated with the first personal information. The information addition system 10 realizes the association of the seventh additional information with the first personal information in the manner described above while the user refers to the outgoing-call or incoming-call historical information.

Since the above processes of associating the additional information with the first personal information and storing the additional information associated with the first personal information can be performed simultaneously with processes of indicating the additional information, described below, the additional information is stored in the following manner according to this embodiment of the present disclosure. Specifically, the information addition system 10 generates an additional information box and performs a process of associating the generated additional information box with the first personal information. In addition, the information addition system 10 performs a process of storing the additional information in the additional information box. With these processes, the information addition system 10 can associate the additional information with the first personal information in units of the additional information boxes. The additional information box is generated in, for example, a predetermined area in the storage device 7. Furthermore, when a "registering of additional information" state or a "waiting for registration instruction" state is switched to a "no additional information" state, which states are described below, the information addition system 10 performs a registration process of registering the additional information box associated with the first personal information, instead of the additional information box previously registered, to update the additional information box. After the registration process is performed, the information addition system 10 does not process the additional information box previously registered as the additional information box. Consequently, the information addition system 10 can associate new additional information with the first personal information at the outgoing call or the incoming call and store the additional information associated with the first personal information and, simultaneously, can indicate the additional information previously registered before the registration process is performed. Since the sixth and seventh additional information is not updated each time the outgoing call or the incoming call is made, the sixth and seventh additional information may be associated with the first personal information without being stored in the additional information box.

Figure 3:
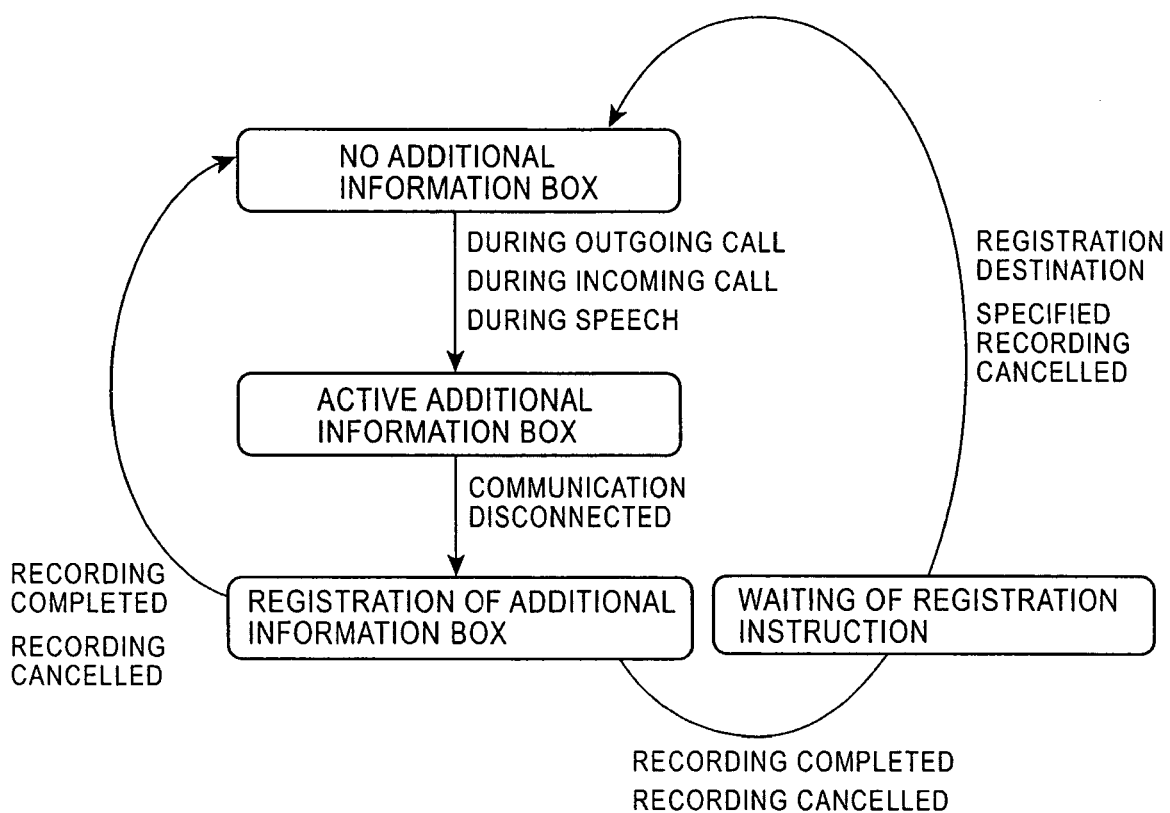
FIG. 3 is a state transition diagram illustrating a process of storing additional information, performed by the information addition system.

FIG. 3 is a state transition diagram illustrating the process of storing the additional information, performed by the information addition system 10. Referring to FIG. 3, the state transition diagram includes "no additional information box" indicating a state in which the additional information box is not generated, "active additional information box" indicating a state in which the additional information is to be stored in the additional information box, and "registration of additional information box" indicating a state in which the additional information box is to be registered. The state transition diagrams further includes "waiting for registration instruction" indicating a state in which the information addition system 10 waits for an instruction on whether a registration destination of the additional information box is to be specified or cancelled if no registration destination is specified. As shown in FIG. 3, the "no additional information box" is switched to the "active additional information box" during an outgoing call, during an incoming call, or during a speech. The "active additional information box" is switched to the "registration of additional information box" when the communication by the mobile telephone 1 is disconnected. If the registration destination is specified, the "registration of additional information box" is switched to the "no additional information box" when completion of the recording or cancel of the recording is indicated. If the registration destination is not specified, the "registration of additional information box" is switched to the "waiting for registration instruction" when the completion of the recording or the cancel of the recording is indicated. In this case, when the registration destination is specified or the cancel of the recording is indicated, the "waiting for registration instruction" is switched to the "no additional information box". The state in which the registration destination is not specified means a state in which no communication partner is registered in the address book, that is, a state in which there is no first personal information in the address book. The registration destination to be specified when there is no registration destination will be described below.

Figure 4:
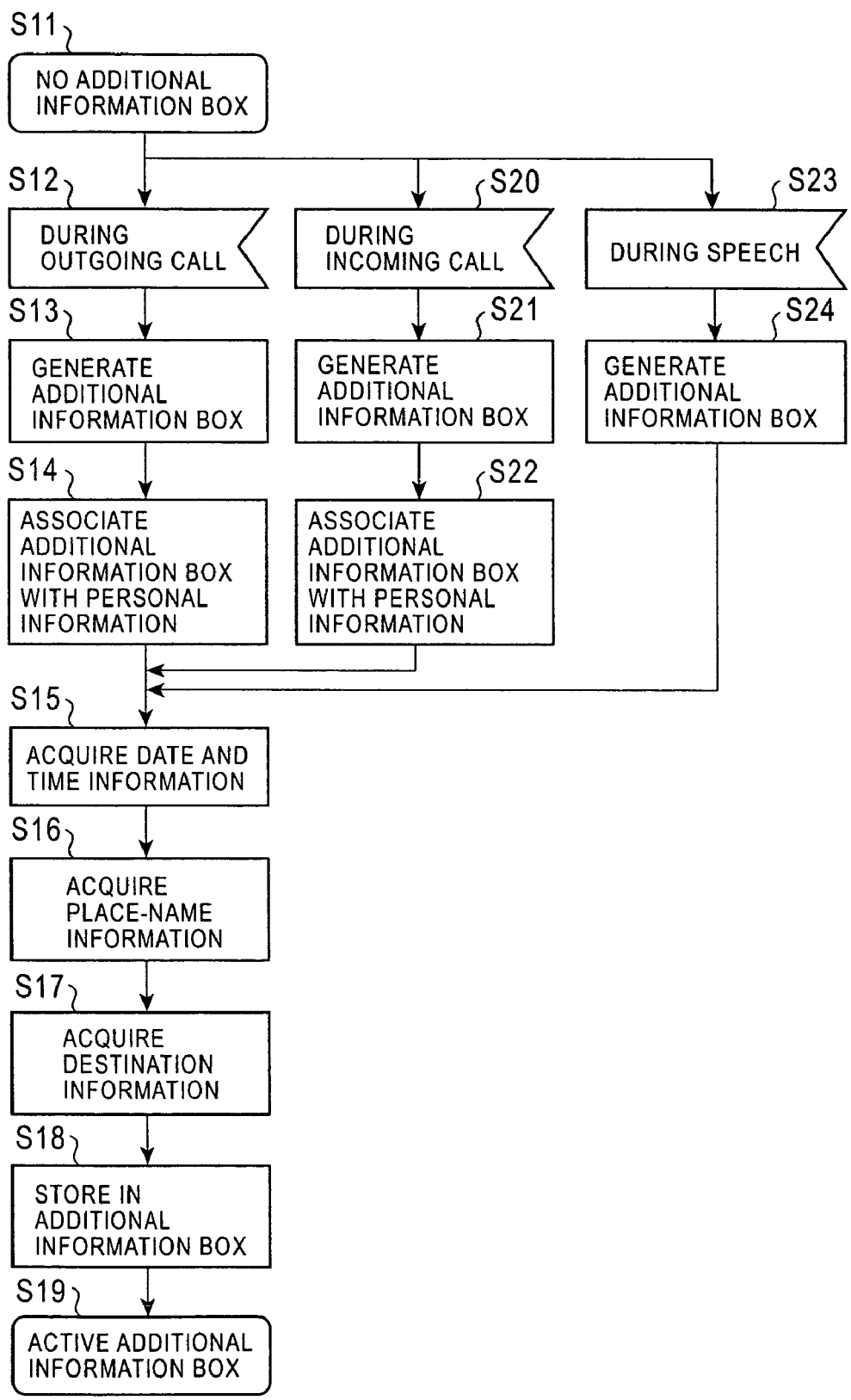
FIG. 4 is a flowchart showing an exemplary process performed while a "no additional information box" state is switched to an "active additional information box" state.

FIGS. 4, 5, 6, and 7 are flowcharts showing an exemplary process and state performed before the additional information box is registered. The process and state is divided into the flowcharts shown in FIGS. 4, 5, 6, and 7. Referring to FIG. 4, if the mobile telephone 1 makes an outgoing call in the "no additional information box" state in Step S11, then in Step S12, the information addition system 10 is in an outgoing-call state. In Step S13, the information addition system 10 generates the additional information box. In Step S14, the information addition system 10 associates the generated additional information box with the first personal information. In Step S15, the information addition system 10 acquires the date and time information as the first additional information. In Steps S16 and S17, the information addition system 10 acquires the place-name information and the destination information as the second additional information. In Step S18, the information addition system 10 stores the first and second additional information in the additional information box. After the additional information is stored in the additional information box, then in Step S19, the "no additional information box" state is switched to the "active additional information box" state.

If the mobile telephone 1 receives an incoming call in the "no additional information box" state in Step S11, then in Step S20, the information addition system 10 is in an incoming-call state. In Step S21, the information addition system 10 generates the additional information box. In Step S22, the information addition system 10 associates the generated additional information box with the first personal information. After the information addition system 10 performs the association of the additional information box with the first personal information, the information addition system 10 proceeds to Step S15. If no communication partner is registered in the address book in Step S11, then in Step S23, a user performs a predetermined input operation with the operating unit 5 during the speech. In Step S24, the information addition system 10 generates the additional information box. After the information addition system 10 performs the generation of the additional information box in Step S24, the information addition system 10 proceeds to Step S15. The additional information can be generated even if the user speaks to a communication partner that is not registered in the address book.

Figure 5:
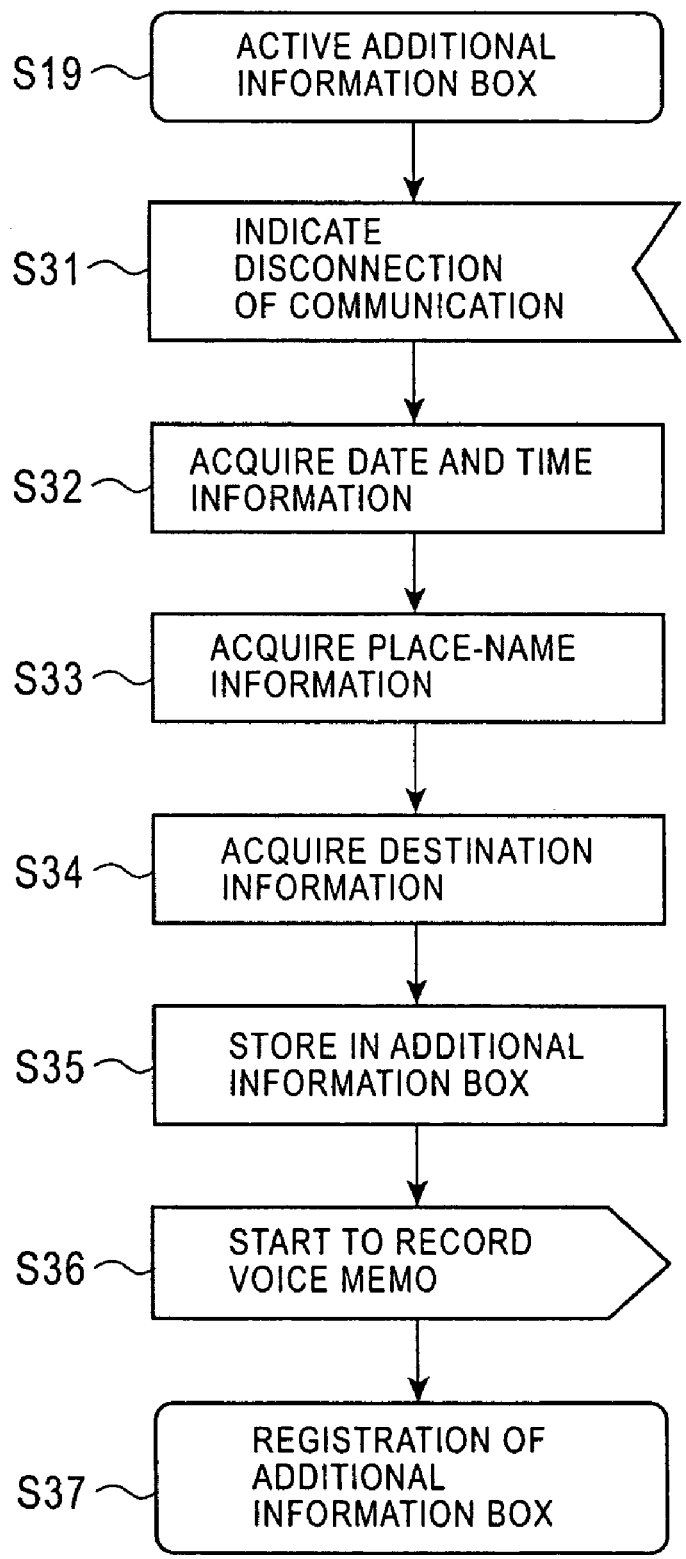
FIG. 5 is a flowchart showing an exemplary process performed while the "active additional information box" state is switched to a "registration of additional information box" state.

Referring to FIG. 5, if the disconnection of the communication is indicated in Step S31 in the "active additional information box" state in Step S19, then in Step S32, the information addition system 10 acquires the date and time information as the first additional information. In Steps S33 and S34, the information addition system 10 acquires the place-name information and the destination information as the second additional information. The information addition system 10 can acquire the date and time information, the place-name information, and the destination information as the additional information in the above manner even if the communication is disconnected. In Step S35, the information addition system 10 stores the additional information in the additional information box. In Step S36, the audio unit 300 starts to record a voice input through the microphone 2 as the first voice-memo information. In Step S37, the "active additional information box" state is switched to the "registration of additional information box" state.

Figure 6:
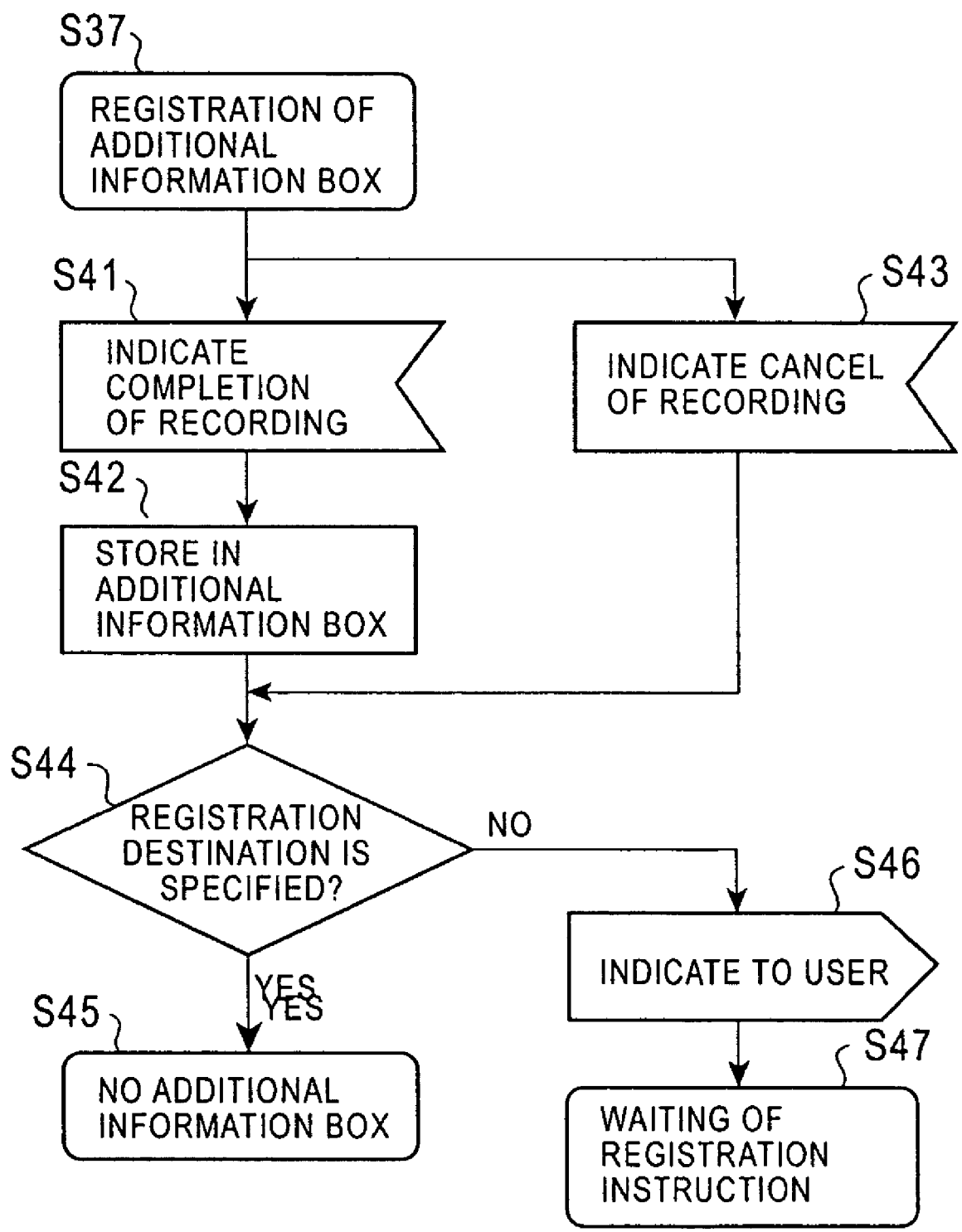
FIG. 6 is a flowchart showing an exemplary process performed while the "registration of additional information box" state is switched to the "no additional information box" state or a "waiting of registration instruction" state.

Referring to FIG. 6, if completion of the recording is indicated in Step S41 in the "registration of additional information box" state in Step S37, then in Step S42, the information addition system 10 stores the first voice-memo information generated by the audio unit 300 in the additional information box as the third additional information. If cancel of the recording is indicated in Step S43 in the "registration of additional information box" state in Step S37, the information addition system 10 proceeds to Step S44. In Step S44, the information addition system 10 determines whether the registration destination of the additional information box is registered. If the communication partner is registered in the address book, then in Step S45, the information addition system 10 registers the additional information box and the "registration of additional information box" state is switched to the "no additional information box" state. If the additional information box is generated during the speech, then in Step S46, the information addition system 10 causes the screen control unit 6 to display the fact that no communication partner is registered in the address book to indicate to the user the fact that no communication partner is registered in the address book. In Step S47, the "registration of additional information box" state is switched to the "waiting for registration instruction" state.

Figure 7:
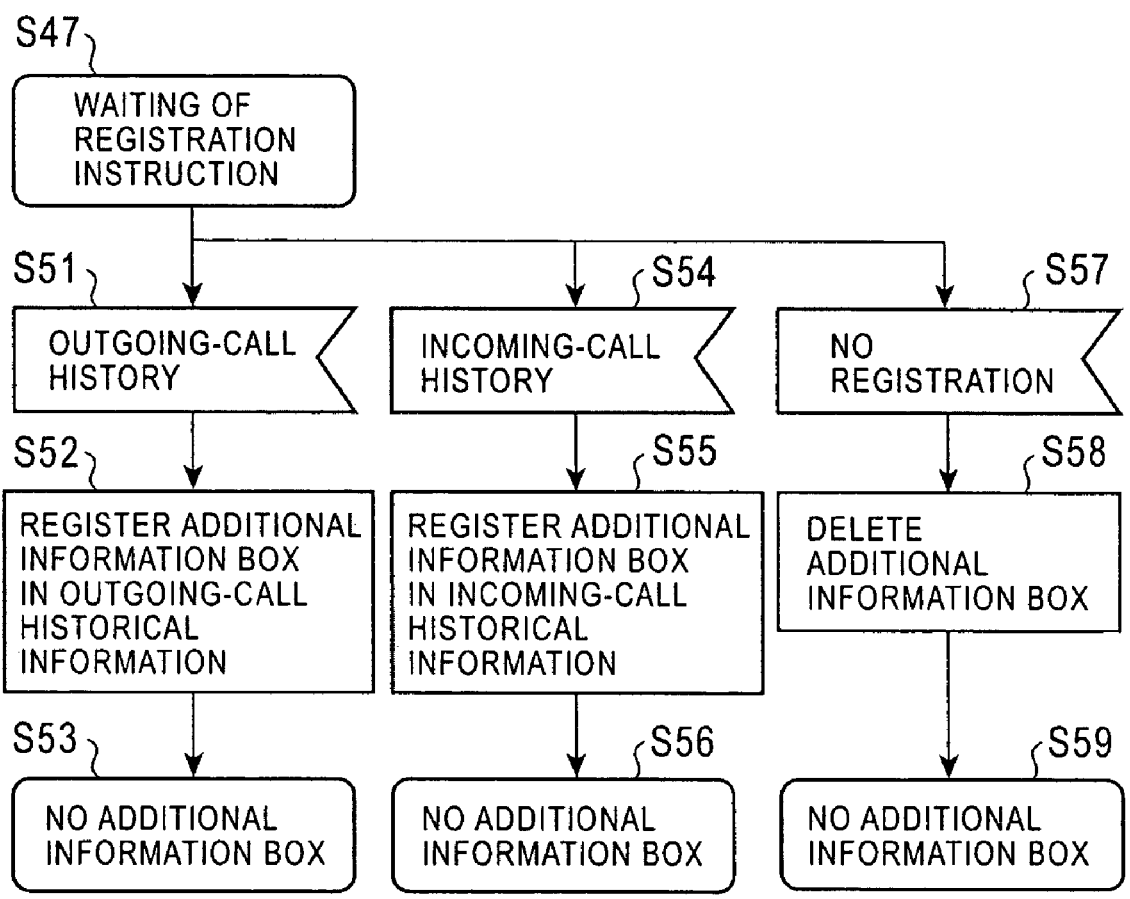
FIG. 7 is a flowchart showing an exemplary process performed while the "waiting of registration instruction" state is switched to the "no additional information box" state.

Referring to FIG. 7, if an instruction to register the additional information box in the outgoing-call historical information is issued in Step S51 in the "waiting of registration instruction" state in Step S47, then in Step S52, the information addition system 10 associates the additional information box with the outgoing-call historical information and registers the additional information box associated with the outgoing-call historical information. In Step S53, the "waiting of registration instruction" state is switched to the "no additional information box" state. If an instruction to register the additional information box in the incoming-call historical information is issued in Step S54 in the "waiting of registration instruction" state in Step S47, then in Step S55, the information addition system 10 associates the additional information box with the incoming-call historical information and registers the additional information box associated with the incoming-call historical information. In Step S56, the "waiting of registration instruction" state is switched to the "no additional information box" state. As described above, the information addition system 10 can register the additional information box in the outgoing-call or incoming-call historical information, instead of the first personal information, if the communication partner is not registered in the address book. If an instruction not to register the additional information box is issued in Step S57 in the "waiting of registration instruction" state in Step S47, then in Step S58, the information addition system 10 deletes the additional information box. In Step S59, the "waiting of registration instruction" state is switched to the "no additional information box" state.

Figure 8:
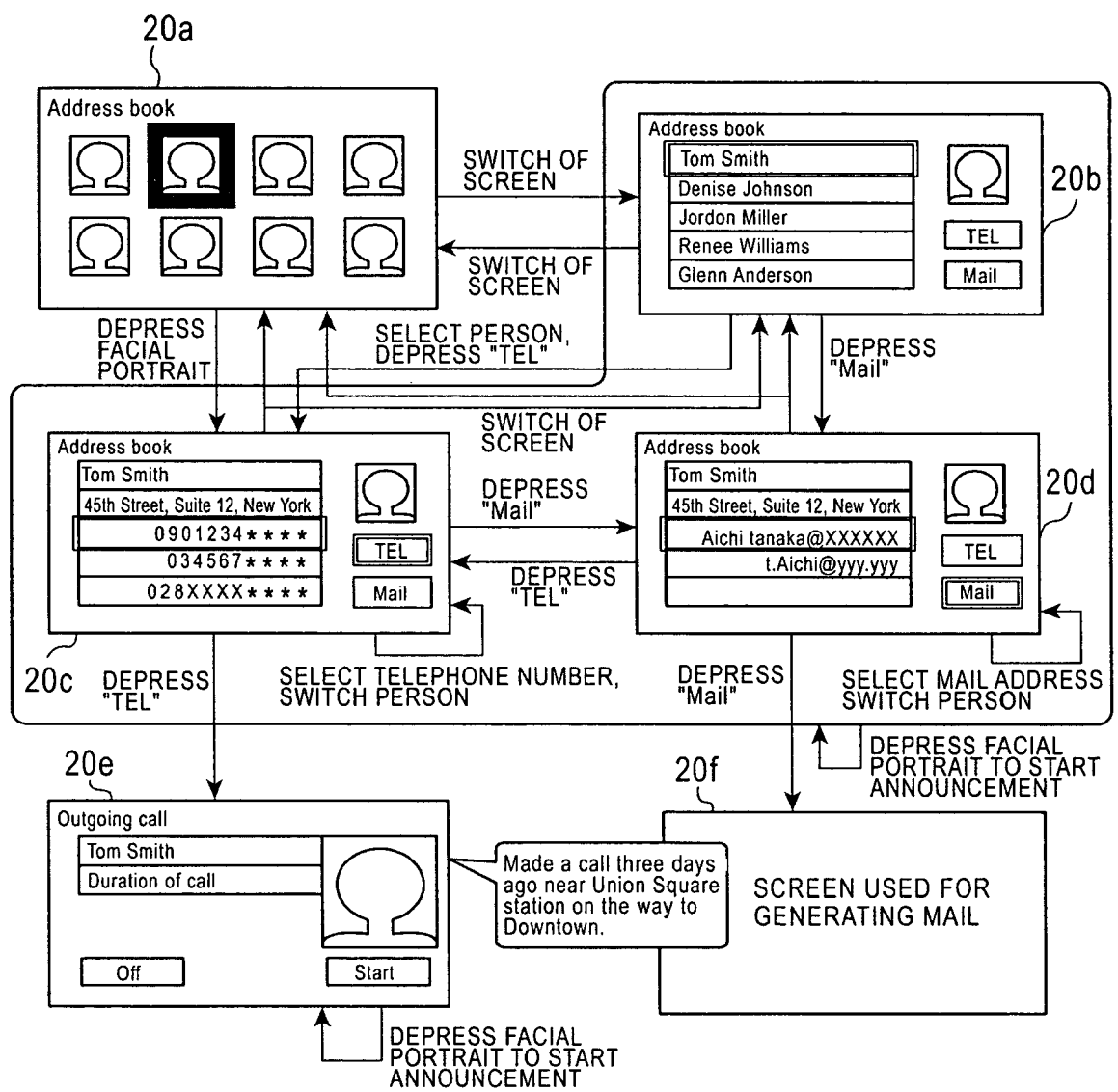
FIG. 8 shows an exemplary process in which the information addition system indicates the additional information when a user dials with an address book.

FIG. 8 shows an exemplary process in which the information addition system 10 indicates the additional information when a user dials with the address book. As shown in FIG. 8, according to an embodiment of the present disclosure, the address book has display modes from a display screen 20*a* to a display screen 20*d* (the display screens from 20*a* to 20*d* are hereinafter collectively referred to as the display screens 20). The display screens 20 can be switched to each other by a predetermined input operation with the operating unit 5. The display screens 20 are generated and displayed by the screen control unit 6 under the control of the hands-free unit 200 on the basis of the address book information including the first personal information stored in the storage device 7 and the additional information corresponding to the first personal information. The display screen 20*a* displays facial portraits. These facial portraits are displayed on the basis of the sixth additional information. The display screen 20*b* displays names and the facial portrait corresponding to a name that is selected with the cursor.

The display screen 20*c* displays the telephone numbers of a person selected in the display screen 20*a*. The name, the address, and the facial portrait of the selected person are also displayed in the display screen 20*c*. Depressing "TEL" with the cursor being put on a target on the display screen 20*b* displays the display screen 20*c*. Depressing a "facial portrait" that is selected on the display screen 20*a* also displays the display screen 20*c*. The display screen 20*d* displays the e-mail addresses of the person displayed in the display screen 20*c*. Depressing "Mail" on the display screen 20*c* displays the display screen 20*d*. The name, the address, and the facial portrait of the selected person are also displayed in the display screen 20*d*, like the display screen 20*c*. When "Mail" is depressed on the display screen 20*d*, the display screen 20*d* is switched to a display screen 20*f* for generating an e-mail. When "TEL" is depressed on the display screen 20*d*, the display screen 2d is switched back to the display screen 20c. Depressing "Mail" with the cursor being put on a target on the display screen 20b also displays the display screen 20d. On the display screens 20c and 20d, for example, depressing a "right" button or a "left" button of the operating unit 5 can switch a person that is displayed to the subsequent person in the address book.

According to this embodiment of the present disclosure, when a user depresses "TEL" on the display screen 20c, the user can make a call by the mobile telephone 1. When the mobile telephone 1 makes an outgoing call, a screen, such as the display screen 20e, is displayed. The information addition system 10 identifies the first personal information corresponding to the dialed telephone-number data in the personal information database. Since the address book is displayed on the basis of the first personal information in this embodiment of the present disclosure, it is possible to easily identify the first personal information. Simultaneously with the identification, the information addition system 10 outputs by voice the content of data on the basis of the additional information that was previously registered in the identified first personal information. In other words, the information addition system 10 functions as first information indicating means for outputting by voice the content of the data on the basis of the additional information. According to this embodiment of the present disclosure, the information addition system 10 can continue to indicate the content of the data to the audio unit 300 through the speaker 3 until the communication partner responds.

In addition, depressing "Facial portrait" on the display screen 20b, 20c, or 20d allows the information addition system 10 to output by voice the content of the data on the basis of the additional information. The content of the data on the basis of the additional information is, for example, "Made a call three days ago near Union Square station on the way to Downtown", as schematically shown in the display screen 20e. In this content of the data, "made a call three days ago" corresponds to the content of the data on the basis of the date and time information at the outgoing call, associated as the first additional information. "Near Union Square station on the way to Downtown" corresponds to the content of the data on the basis of the place-name information and the destination information associated as the second additional information. The modes of the display screens and the method of switching the display screens are not limited to the ones described above in this embodiment and described below and can be realized in various modes.

Figure 9:
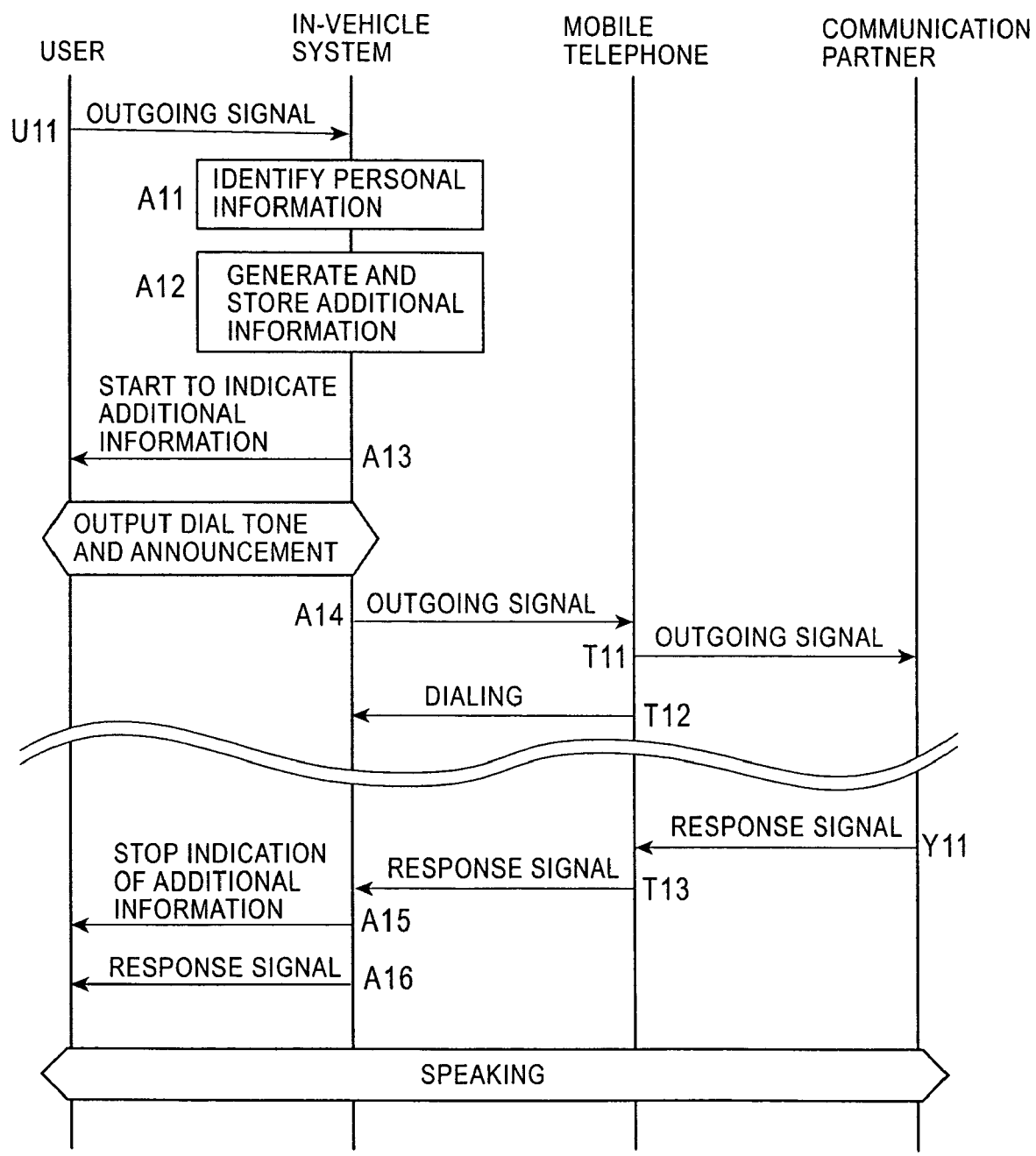
FIG. 9 is a sequence chart showing an exemplary operation performed between the user, the in-vehicle system, the mobile telephone, and a communication partner when the user makes a call.

FIG. 9 is a sequence chart showing an exemplary operation performed between a user, the in-vehicle system 1000, the mobile telephone 1, and the communication partner when the user makes a call. For simplicity, the steps performed by the information addition system 10, the controller 100a, the controller 200a, or the controller 300a are referred to as the steps performed by the in-vehicle system 1000. The same applies to the subsequent sequence charts. Referring to FIG. 9, in Step U11, for example, when the user depresses "TEL" on the display screen 20b, the operating unit 5 transmits an outgoing signal to the in-vehicle system 1000. In Step A11, the in-vehicle system 1000 receives the outgoing signal and identifies the first personal information with the telephone-number data on the basis of the content of the data displayed in the address book. In Step A12, the in-vehicle system 1000 generates the additional information and the additional information box, associates the generated additional information box with the first personal information, and stores the additional information in the additional information box. In Step A13, the in-vehicle system 1000 outputs the content of the data on the basis of the additional information that was previously registered in the identified first personal information to start an announcement to the user. At this time, the user hears the dial tone and the announcement. In Step A14, the in-vehicle system 1000 transmits the telephone-number data and the outgoing signal to the mobile telephone 1. In Step T11, the mobile telephone 1 receives the outgoing signal and makes the outgoing call. In Step T12, the mobile telephone 1 transmits a signal indicating the dialing to the in vehicle system 1000.

In Step Y11, the communication partner responds and a response signal is transmitted from the telephone of the communication partner to the mobile telephone 1. In Step T13, the mobile telephone 1 receives the response signal and transmits the response signal to the in-vehicle system 1000. In Step A15, the in-vehicle system 1000 receives the response signal and stops the above announcement and the output of the dial tone. In Step A16, the in-vehicle system 1000 causes the screen control unit 6 to generate and display, for example, a display screen 30c described below to indicate the response to the user. A telephone conversation between the user and the communication partner is started and the mobile telephone 1 is in a busy state. The audio unit 300 can simultaneously control multiple sound sources. For example, the audio unit 300 can reduce or mute the volume of the dial tone during the announcement or can output the busy tone, in addition to the announcement, with another speaker being provided.

Figure 10:
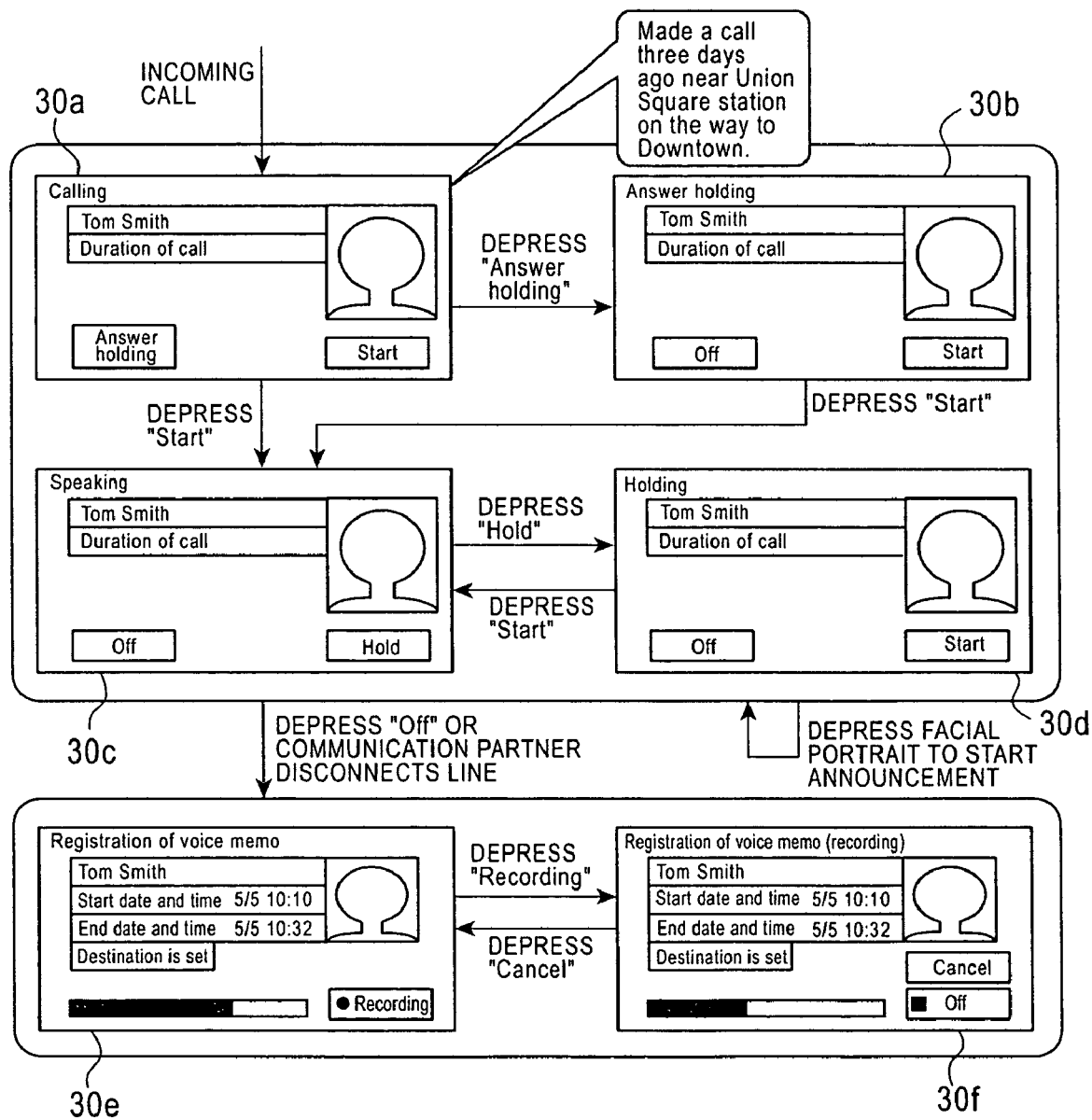
FIG. 10 shows an exemplary process in which the information addition system indicates the additional information when the mobile telephone receives a call.

FIG. 10 shows an exemplary process in which the information addition system 10 indicates the additional information when the mobile telephone 1 receives an incoming call. Referring to FIG. 10, a display screen 30a is displayed when the mobile telephone 1 receives an incoming call. When the mobile telephone 1 receives an incoming call, the hands-free unit 200 identifies the communication partner from which the incoming call is received with the telephone-number data. The information addition system 10 acquires the telephone number from the hands-free unit 200 and identifies the first personal information corresponding to the acquired telephone-number data, in the personal information database. A name shown in the display screen 30a is displayed on the basis of the identified first personal information. A facial portrait shown in the display screen 30a is displayed on the basis of the sixth additional information registered in the identified first personal information. Depressing "Answer holding" on the display screen 30a allows a user to hold an answer. Depressing "Start" on the display screen 30a allows the user to answer the call.

As described above, when the mobile telephone 1 receives an incoming call, the information addition system 10 continues to output by voice the content of the data on the basis of the additional information until "Start" is depressed, as schematically shown in the display screen 30a. When "Answer holding" is selected, it is possible to cause the information addition system 10 to output the above content of the data until "Off" used for terminating the call or "Start", shown in a display screen 30b, is depressed. It is also possible to cause the information addition system 10 to output the above content of the data after the "Answer holding" is depressed.

Depressing "Start" on the display screen 30a starts the call and displays a display screen 30c. The display screen 30c has "Off" used for terminating the call and "Hold" used for placing the call on hold. Depressing "Hold" displays a display screen 30d. Also in this case, the information addition system 10 continues to output by voice the content of the data on the basis of the additional information until "Start" is depressed. When "Off" is depressed on the display screen 30c or the communication partner disconnects the line, a display screen

30e is displayed. The display screen 30e displays "Start date and time" when the speaking is started, "End date and time" when the speaking is terminated, and "Destination" indicating whether the destination is set in the navigation unit 100 during the speaking, in addition to the name and the facial portrait. These items can be displayed on the basis of the additional information associated with the first personal information.

When "Recording" is depressed on the display screen 30e, the audio unit 300 starts recording. The depression of "Recording" displays a display screen 30f. When "Off" on the display screen 30f is depressed, the recording is stopped and the first voice-memo information is generated. The first voice-memo information is also generated after a predetermined time elapsed. When "Cancel" on the display screen 30f is depressed, the display screen 30f goes back to the display screen 30e without generating the first voice-memo information. When "Start time" is depressed on the display screen 30e or 30f, it is possible to cause the navigation unit 100 to display the position at the time when the speaking is started on the map on the basis of the additional information. Similarly, when "End date and time" is depressed on the display screen 30e, it is possible to cause the navigation unit 100 to display the position at the time when the speaking is terminated on the map. When "Destination" is depressed on the display screen 30e, it is possible to display the destination set in the navigation unit 100 at the incoming call on the map.

Figure 11:
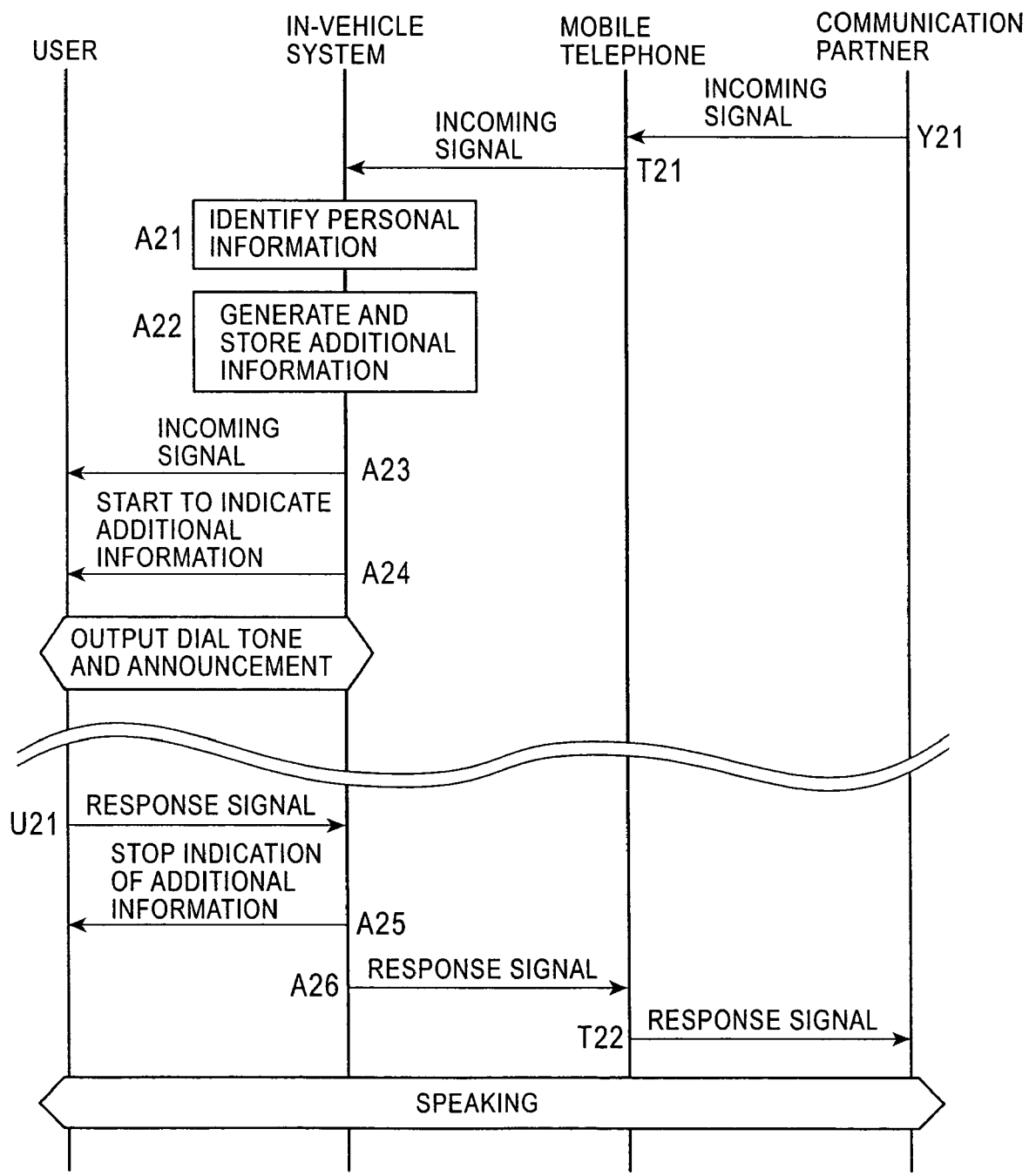
FIG. 11 is a sequence chart showing an exemplary operation performed between the user, the in-vehicle system, the mobile telephone, and the communication partner when the communication partner makes a call to the user.

FIG. 11 is a sequence chart showing an exemplary operation performed between a user, the in-vehicle system 1000, the mobile telephone 1, and the communication partner when the communication partner makes a call to the user. When the communication partner makes a call to the user with the telephone, in Step Y21, a reception signal is transmitted from the telephone of the communication partner to the mobile telephone 1. In Step T21, the mobile telephone 1 receives the reception signal and supplies the reception signal to the in-vehicle system 1000. In Step A21, the mobile telephone 1 receives the reception signal and identifies the first personal information with the telephone-number data on the basis of the reception signal. In Step A22, the in-vehicle system 1000 generates the additional information box, associates the generated additional information box with the first personal information, and stores the additional information in the additional information box. In Step A23, the in-vehicle system 1000 causes the screen control unit 6 to generate and display, for example, the display screen 30a to indicate to the user that the incoming call is received. In Step A24, the in-vehicle system 1000 outputs the content of the data on the basis of the additional information that was previously registered in the identified first personal information to start an announcement to the user. At this time, the user hears the dial tone and the announcement.

When the user selects "Start" on the display screen 30a, in Step U21, the operating unit 5 supplies a response signal to the in-vehicle system 1000. In Step A25, the in-vehicle system 1000 receives the response signal and stops the output of the dial tone along with the announcement. In Step A26, the in-vehicle system 1000 supplies the response signal to the mobile telephone 1. In Step T22, the mobile telephone 1 receives the response signal and transmits the response signal to the telephone of the communication partner. A telephone conversation between the user and the communication partner is started and the mobile telephone 1 is in a busy state.

Figure 12:
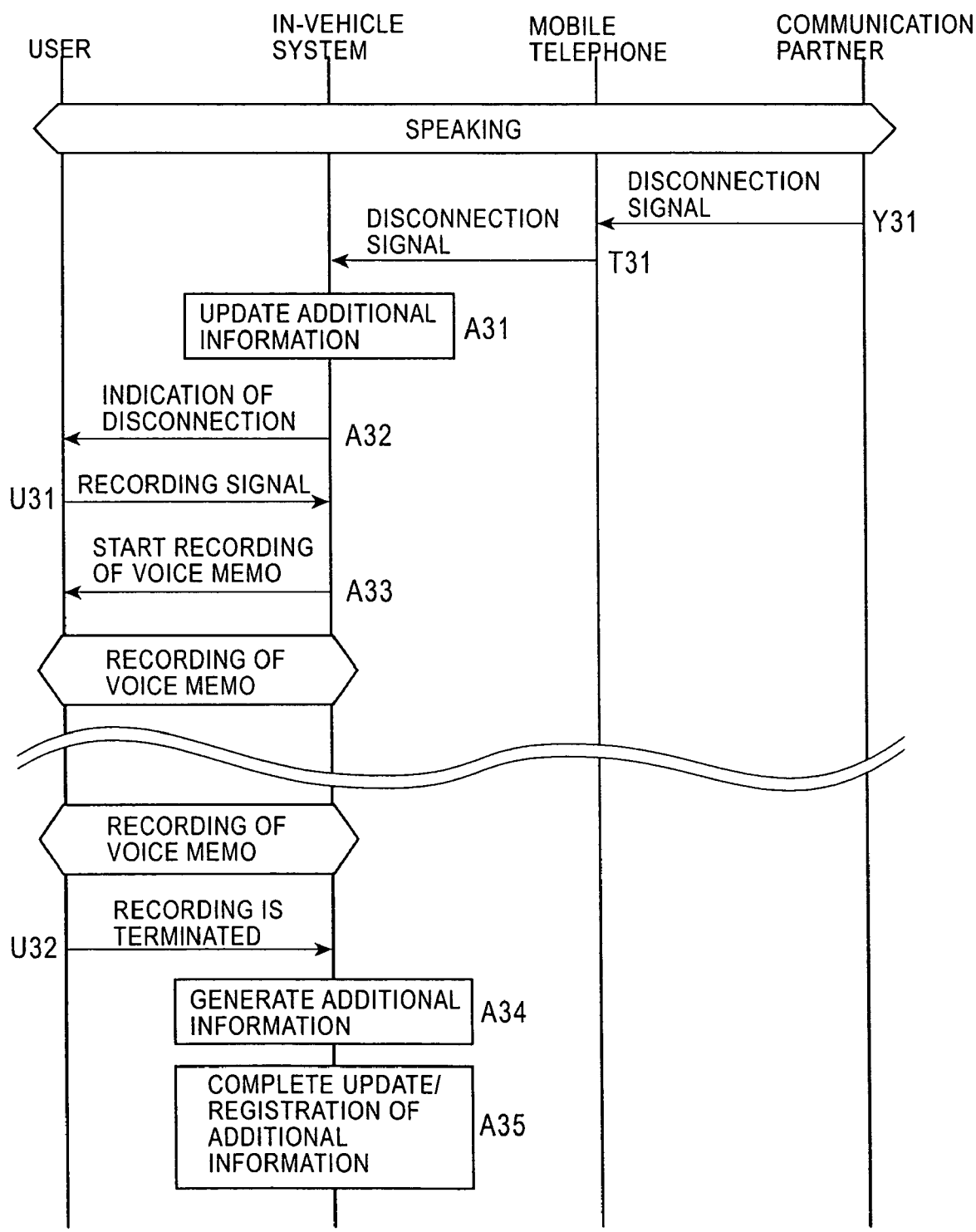
FIG. 12 is a sequence chart showing an exemplary operation performed between the user, the in-vehicle system, the mobile telephone, and the communication partner when the telephone conversation is terminated.

FIG. 12 is a sequence chart showing an exemplary operation performed between a user, the in-vehicle system 1000, the mobile telephone 1, and the communication partner when the telephone conversation is terminated. When the communication partner disconnects the line, then in Step Y31, a disconnection signal is transmitted from the telephone of the communication partner to the mobile telephone 1. In Step T31, the mobile telephone 1 receives the disconnection signal and supplies the disconnection signal to the in-vehicle system 1000. In Step A31, the in-vehicle system 1000 receives the disconnection signal and preliminarily registers the additional information box to preliminarily update the additional information previously registered. In Step A32, the in-vehicle system 1000 causes the screen control unit 6 to generate and display, for example, the display screen 30e to indicate to the user that the telephone conversation is terminated. In Step U31, when the user depresses "Recording" on the display screen 30e, the operating unit 5 supplies a recording signal to the in-vehicle system 1000. In Step A33, the in-vehicle system 1000 receives the recording signal and starts to record a voice memo. The in-vehicle system 1000 causes the screen control unit 6 to generate and display the display screen 30f to indicate to the user that the voice memo is recording.

When the user depresses "Off" on the display screen 30f after inputting the voice through the microphone 2, then in Step U32, the operating unit 5 supplies a termination signal to the in-vehicle system 1000. In Step A34, the in-vehicle system 1000 receives the termination signal, terminates the recording of the voice memo, and generates the recorded input voice as the third additional information. In Step A35, the in-vehicle system 1000 stores the third additional information in the additional information box preliminarily registered and registers the additional information box to update the additional information previously registered.

In addition, the information addition system 10 can indicate the additional information in the following manner also when an automatic reception is set. According to this embodiment of the present disclosure, the hands-free unit 200 has, as the reception settings, a manual response mode in which the hands-free unit 200 does not allow automatic response to the mobile telephone 1 and an automatic response mode in which the hands-free unit 200 allows automatic response to the mobile telephone 1. If the reception setting is set to the automatic response mode, the mobile telephone 1 automatically responds after a predetermined time elapses since the incoming call is received. As described above, while the information addition system 10 outputs by voice the content of the data on the basis of the additional information at the incoming call, the announcement is stopped upon response to the incoming call. This termination of the announcement causes no problem if the user responds to the incoming call. However, when the automatic reception is set, the termination of the announcement can be disadvantageously caused by the automatic response mode despite of the user who wants to hear the announcement.

Accordingly, when the reception setting is set to the automatic response mode, the information addition system 10 causes the hands-free unit 200 not to automatically respond to the incoming call transmitted from the mobile telephone 1 until the output by voice of the content of the data on the basis of the additional information is terminated. Specifically, for example, the information addition system 10 supplies a response disabled signal used for causing the hands-free unit 200 not to transmit the response signal to the mobile telephone 1 and supplies a response enabled signal to the hands-free unit 200 after the announcement is terminated. With this process, the user can hear the announcement to the end even with the automatic reception being set.

In addition, the information addition system 10 can indicate the additional information in the following manner while the outgoing-call or incoming-call history is referred to. The information addition system 10 can also display the content of the data on the basis of the additional information, instead of outputting the content of the data by voice. In this case, the information addition system 10 supplies the additional information to the screen control unit 6 to cause the screen control unit 6 to generate and display the additional information. Accordingly, the user can know the content of the data on the basis of the additional information from the displayed information.

Figure 13:
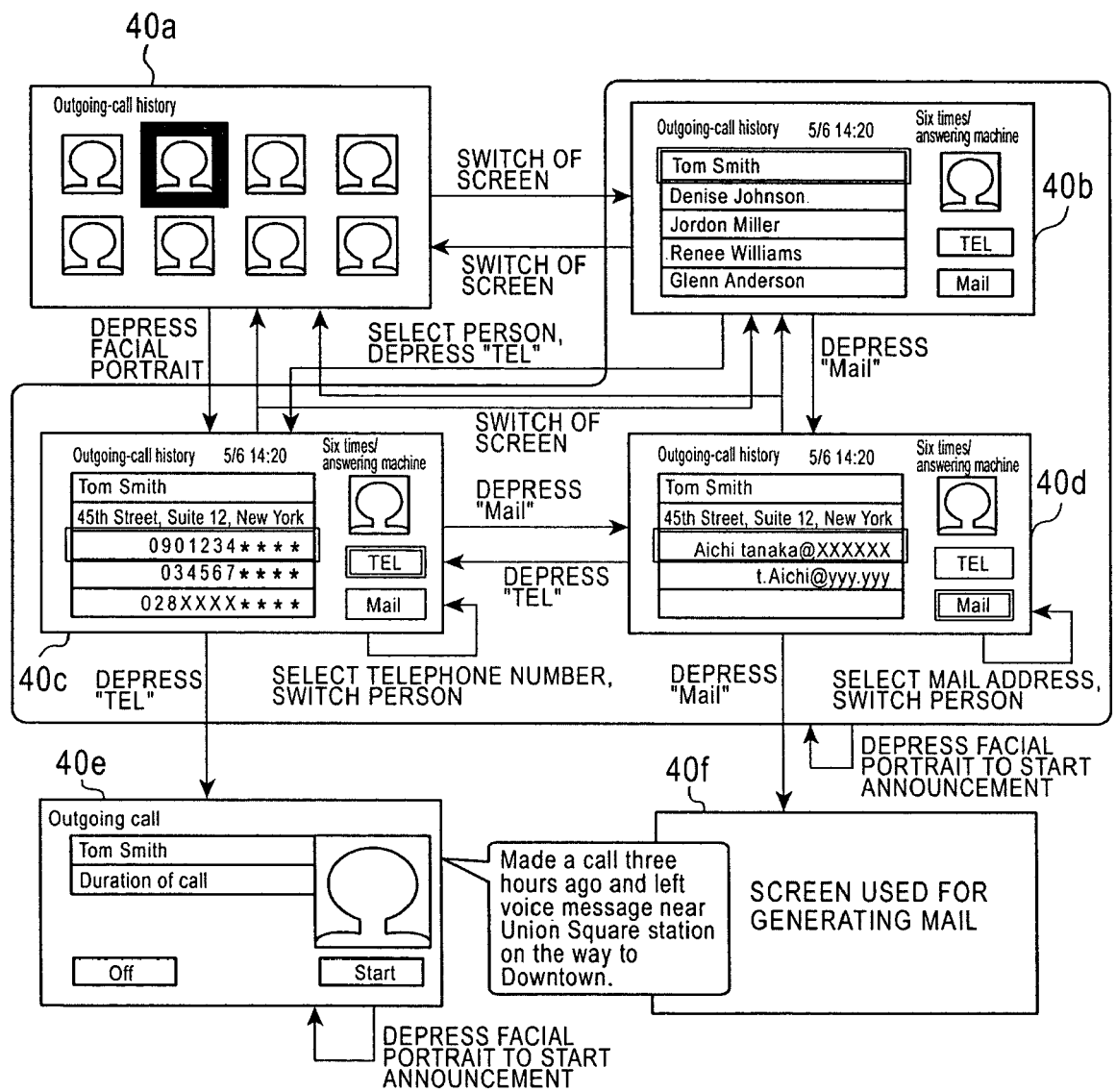

FIG. 13 shows an exemplary process in which the information addition system 10 indicates the additional information by voice or displays the additional information when the outgoing-call history is referred to. As shown in FIG. 13, according to an embodiment of the present disclosure, the outgoing-call historical information is displayed in display modes from a display screen 40a to a display screen 40d (the display screens from 40a to 40d are hereinafter collectively referred to as the display screens 40). The display screens 40 can be switched to each other by a predetermined input operation with the operating unit 5, like the display screens 20. The display screens 40 are similar to the display screens 20 except for the following points. The date and time of the previous outgoing call is displayed in the outgoing-call history, as shown in the display screens 40b, 40c, and 40d. The date and time of the previous outgoing call is displayed based on the first additional information. For example, whether the communication partner at the outgoing call is an answering machine can be displayed in the outgoing-call history. The content of the display indicating whether the communication partner at the outgoing call is an answering machine is generated on the basis of the fourth additional information. If the hands-free unit 200 stores the number of times the outgoing call is made during a predetermined period or the number of times the incoming call is received during a predetermined period in the storage device 7 and manages the number of times as frequency-of-use information, the information addition system 10 can process the frequency-of-use information as the additional information. For example, "six times" is displayed on the basis of the additional information, as shown in the display screen 40b, 40c, and 40d.

As in the case where a call is made by the use of the address book described above with reference to FIG. 8, for example, the announcement that "made a call three hours ago and left voice message near Union Square station on the way to Downtown" can be made during "Outgoing call" shown in the display screen 40e. In this announcement, "Made a call three hours ago" is based on the first additional information, "left voice message" is based on the fourth additional information, and "near Union Square station on the way to Downtown" is based on the second additional information. As in the case where a call is made by the use of the address book, described above, the above announcement can be made by depressing the facial portrait on the display screen 40b, 40c, or 40d.

Figure 14:
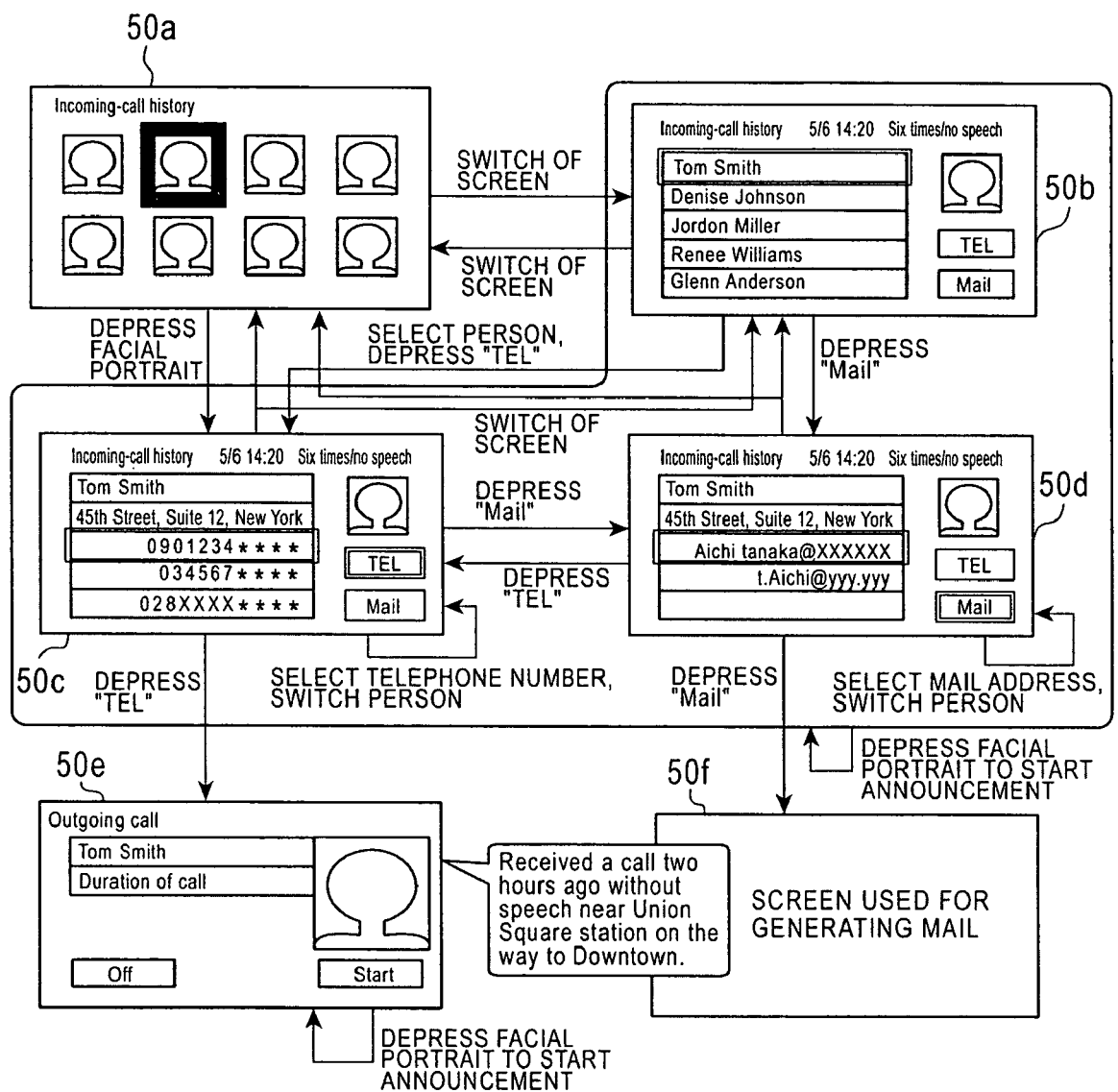

FIG. 14 shows an exemplary process in which the information addition system 10 indicates the additional information by voice or displays the additional information when the incoming-call history is referred to. As shown in FIG. 14, according to an embodiment of the present disclosure, the incoming-call historical information is displayed in display modes from a display screen 50a to a display screen 50d (the display screens from 50a to 50d are hereinafter collectively referred to as the display screens 50). The display screens 50 can be switched to each other by a predetermined input operation with the operating unit 5, like the display screens 40. The display screens 50 are also similar to the display screens 20 except for the following points. The date and time of the previous incoming call is displayed in the incoming-call history, as shown in the display screens 50b, 50c, and 50d, as in the outgoing-call history. For example, whether the mobile telephone 1 responds to the incoming call, that is, whether the caller of the mobile telephone 1 speaks to the communication partner can be displayed in the incoming-call history. The content of the display indicating whether the caller of the mobile telephone 1 speaks to the communication partner is generated on the basis of the fifth additional information. In addition, the information addition system 10 can display the frequency-of-use information as the additional information, as shown in the display screen 50b, 50c, and 50d, as in the outgoing-call history.

As in the case where a call is made by the use of the address book described above with reference to FIG. 8, for example, the announcement that "Received a call two hours ago without speech near Union Square station on the way to Downtown" can be made during "Outgoing call" shown in the display screen 50e. In this announcement, "Received a call two hours ago" is based on the first additional information, "without speech" is based on the fifth additional information, and "near Union Square station on the way to Downtown" is based on the second additional information. As in the case where a call is made by the use of the address book, described above, the above announcement can be made by depressing the facial portrait on the display screen 50b, 50c, or 50d.

The content of the display and the content of the announcement in the outgoing-call history and the incoming-call history can be varied by switching the additional information to be indicated on an operation screen allowing selection of the additional information. Specifically, although the announcement is made on the basis of the first additional information, the second additional information, the fourth additional information, and the fifth additional information in the above embodiments of the present disclosure, the announcement may be made on the basis of the sixth additional information. In this case, for example, a message "additional voice memo" is displayed or an announcement that "recording additional voice memo" is made. The same applies to the content of the announcement at the outgoing call shown in FIG. 8 and that at the incoming call shown in FIG. 10.

Figure 15:
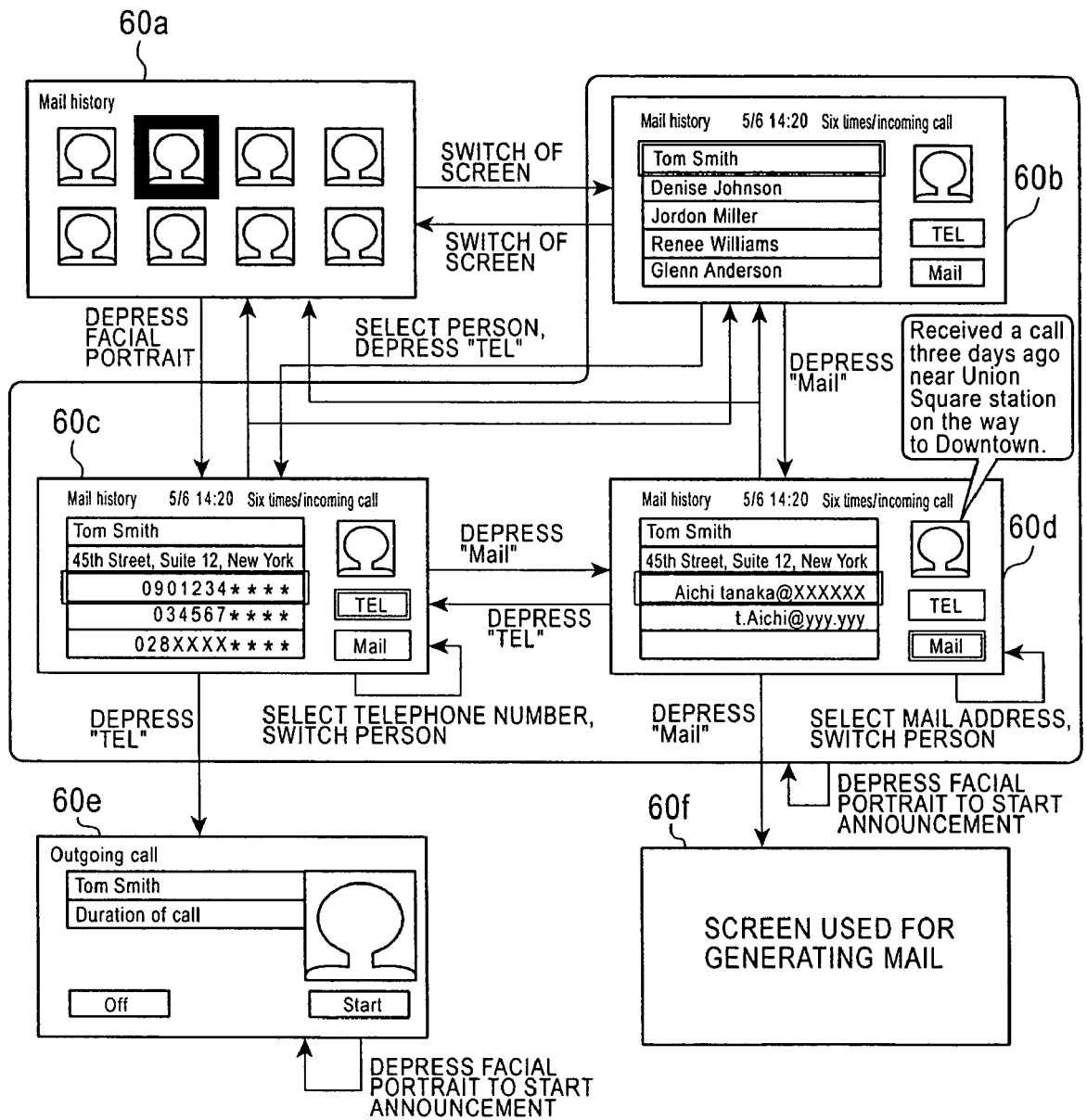

The information addition system 10 can indicate the additional information in the following manner also when a mail history is referred to. FIG. 15 shows an exemplary process in which the information addition system 10 indicates the additional information by voice or displays the additional information when the mail history is referred to. As shown in FIG. 15, according to an embodiment of the present disclosure, the mail history is displayed in display modes from a display screen 60a to a display screen 60d (the display screens from 60a to 60d are hereinafter collectively referred to as the display screens 60). The display screens 60 can be switched to each other by a predetermined input operation with the operating unit 5, like the display screens 50. The display screens 60 are also similar to the display screens 20 except for the following points. The date and time when the previous mail is received or transmitted is shown in the mail history, as shown in the display screens 60b, 60c, and 60d, as in the outgoing-call or incoming-call history. In addition, whether the mail is received or transmitted is shown in the mail history. The date and time when the mail is transmitted or received and whether the mail is received or transmitted are based on the first additional information. Furthermore, the information addition system 10 can display the frequency-of-use information as the additional information, as shown in the display screen 60b, 60c, and 60d, as in the outgoing-call or incoming-call history.

As in the case where a call is made by the use of the address book described above with reference to FIG. 8, for example, the announcement that "Received a call three days ago near Union Square station on the way to Downtown" can be made during the display of the e-mail address shown in the display screen 60d if there is no operation for a predetermined time period or by depressing the facial portrait. In this announcement, "Received a call three days ago" is based on the first additional information and "near Union Square station on the way to Downtown" is based on the second additional information. As in the case where a call is made by the use of the address book, described above, the above announcement can be made by depressing the facial portrait on the display screen 60b or 60c.

Figure 16:
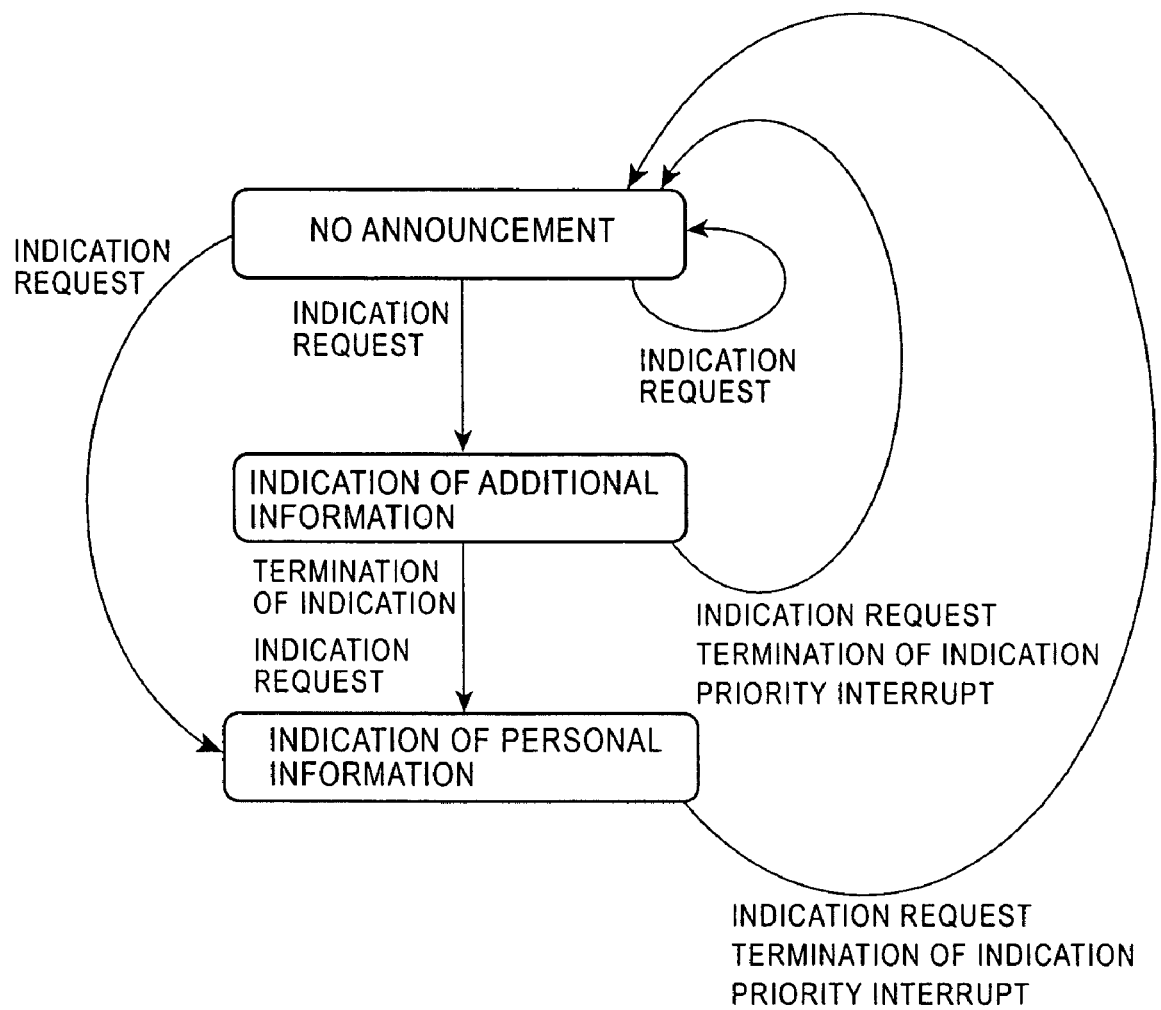
FIG. 16 is a state transition diagram in announcement control to indicate the content of data on the basis of the additional information or first personal information.

FIG. 16 is a state transition diagram in announcement control to indicate the content of data on the basis of the additional information or the first personal information. As shown in FIG. 16, the state transition diagram includes "no announcement", "indication of additional information", and "indication of personal information". In other words, in the announcement control, the content of the indication can be grouped into multiple categories including the "indication of additional information" and the "indication of personal information", and the content of the data on the basis of not only the additional information but also the first personal information can be indicated. In addition, for example, the "indication of additional information" may be grouped into "first indication of additional information", "second indication of additional information", and so on. As shown in FIG. 16, in the announcement control, if an indication request is submitted in the "no announcement" state but other conditions are not satisfied, the state transition is not performed and the indication request is continued to be submitted. In this case, the "no announcement" state is switched to the "indication of additional information" state or the "indication of personal information" state after the other conditions are satisfied. As shown in the "indication of additional information" state, if the indication in one category is terminated, the category is switched to the subsequent category (the "indication of personal information" state) if another indication request is submitted. If an indication request is submitted before the indication is terminated, if no indication request is submitted after the indication is terminated, or if a priority interrupt, such as the outgoing signal, the incoming signal, or the response signal, occurs, the announcement is stopped and the announcement control switches to the "no announcement" state.

Figure 17:
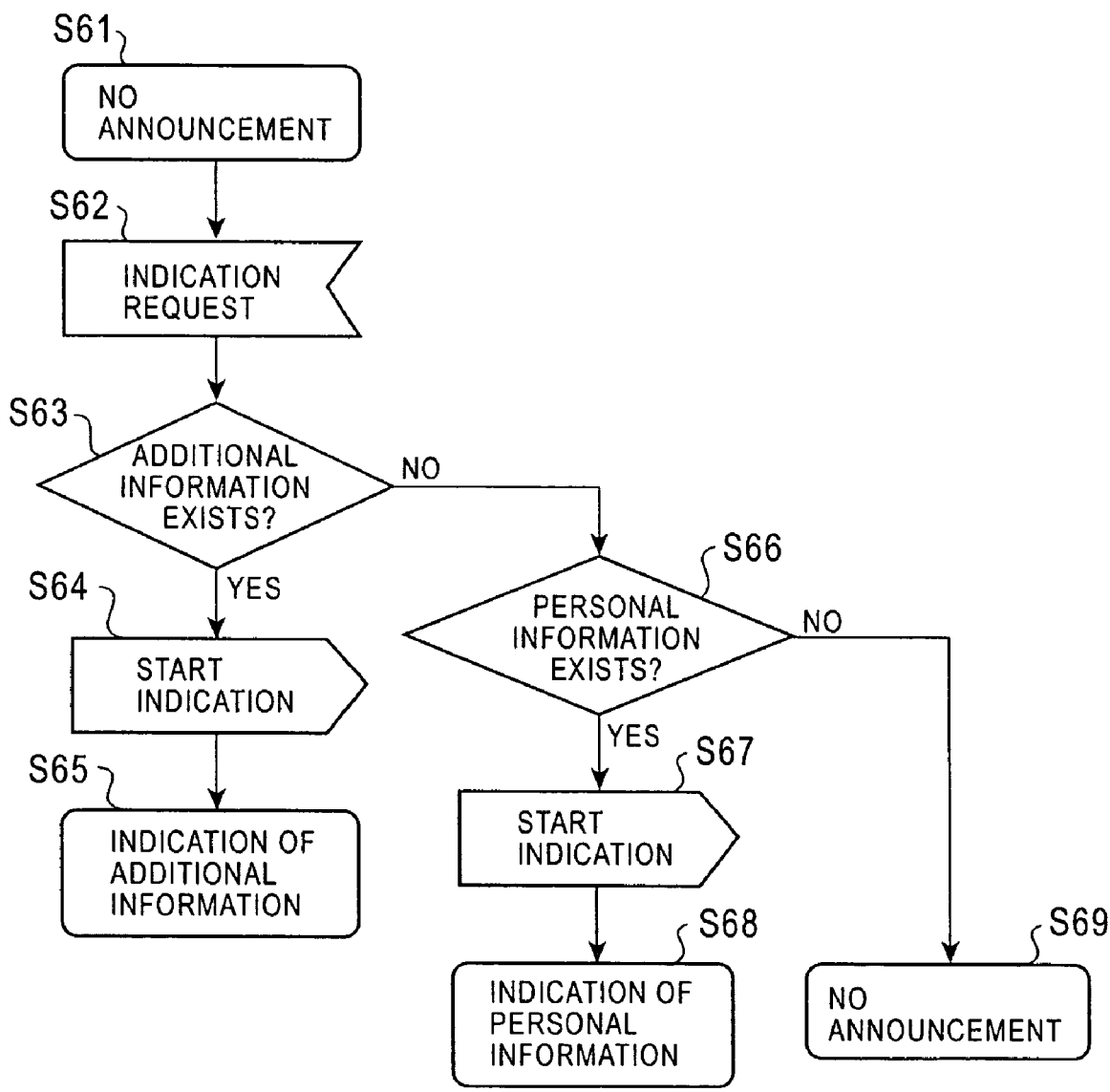
FIG. 17 is a flowchart showing an example of the state transition in the announcement control, switching from a "no announcement" state to the other states.
Figure 18:
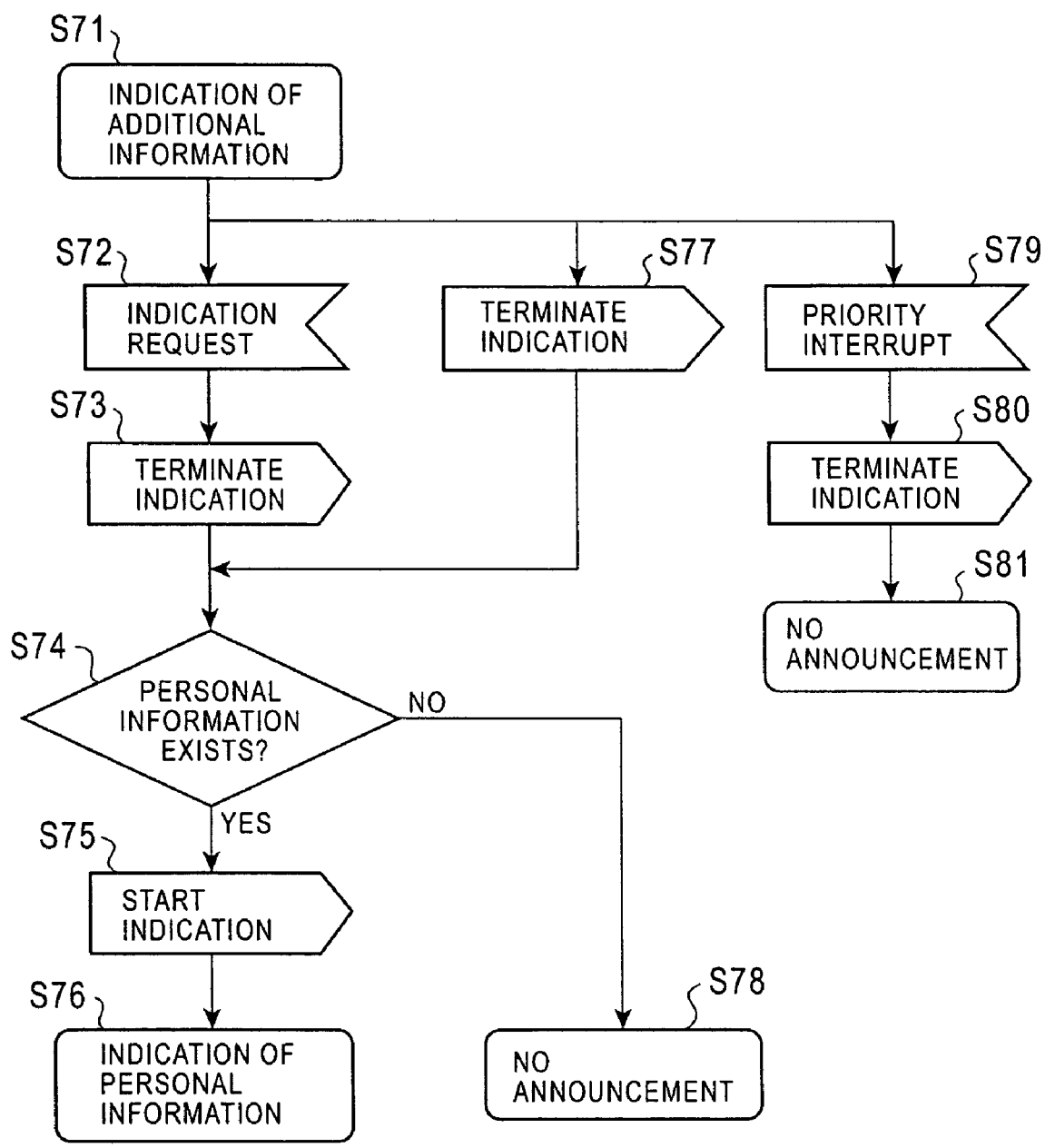
FIG. 18 is a flowchart showing an example of the state transition in the announcement control, switching from an "indication of additional information" state to the other states.
Figure 19:
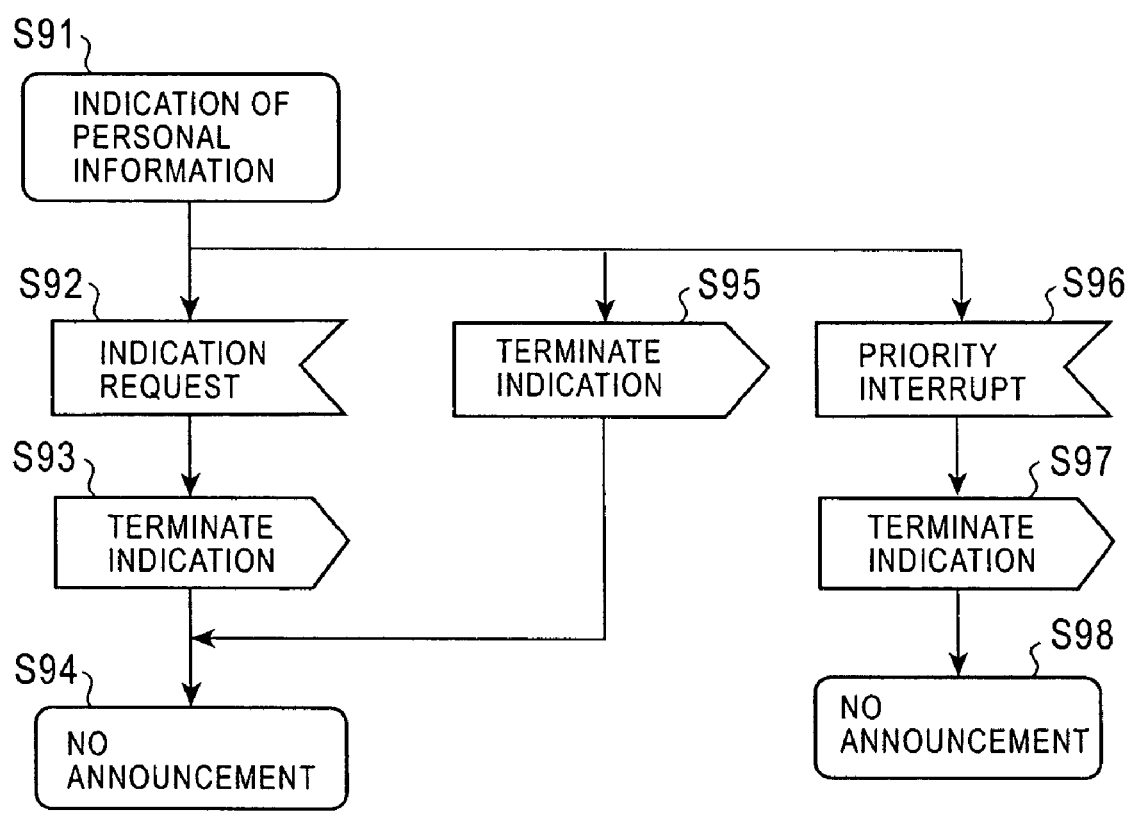
FIG. 19 is a flowchart showing an example of the state transition in the announcement control, switching from an "indication of personal information" state to the other states.

FIGS. 17, 18, and 19 are flowcharts showing examples of the state transition relating to the announcement control. FIG. 17 is a flowchart showing an example of the state transition from the "no announcement" state. If an indication request is submitted in Step S62 in the "no announcement" state in Step S61, then in Step S63, the information addition system 10 determines whether additional information corresponding to the indication request exists. If the information addition system 10 determines that additional information corresponding to the indication request exists, then in Step S64, the information addition system 10 starts to indicate the additional information. In Step S65, the announcement control switches to the "indication of additional information" state. If the information addition system 10 determines in Step S63 that additional information corresponding to the indication request does not exist, in Step S66, the information addition system 10 determines whether the first personal information exists. If the information addition system 10 determines that first personal information exists, then in Step S67, the information addition system 10 starts to indicate the personal information. In Step S68, the announcement control switches to the "indication of personal information" state. If the information addition system 10 determines in Step S66 that first personal information does not exist, then in Step S69, the announcement control switches to the "no announcement" state.

FIG. 18 is a flowchart showing an example of the state transition from the "indication of additional information" state. If an indication request is submitted in Step S72 in the "indication of additional information" state in Step S71, then in Step S73, the information addition system 10 terminates the indication of the additional information. In step S74, the information addition system 10 determines whether the first personal information exists. If the information addition system 10 determines that first personal information exists, then in Step S75, the information addition system 10 starts to indicate the personal information. In Step S76, the announcement control switches to the "indication of personal information" state. If the indication of the additional information is terminated in Step S77 in the "indication of additional information" state in Step S71, the information addition system 10 proceeds to Step S74. If the information addition system 10 determines in Step S74 that first personal information does not exist, then in Step S78, the announcement control switches to the "no announcement" state. If a priority interrupt occurs in Step S79 in the "indication of additional information" state in Step S71, then in Step S80, the information addition system 10 terminates the indication of the additional information. In Step S81, the announcement control switches to the "no announcement" state.

FIG. 19 is a flowchart showing an example of the state transition from the "indication of personal information" state. If an indication request is submitted in Step S92 in the "indication of personal information" state in Step S91, then in Step S93, the information addition system 10 terminates the indication of the personal information. In Step S94, the announcement control switches to the "no announcement" state. If the "indication of personal information" state terminates in Step S95 in the "indication of personal information" state in Step S91, the information addition system 10 proceeds to the "no announcement" state in Step S94. If a priority interrupt occurs in Step S96 in the "indication of personal information" state in Step S91, then in Step S97, the information addition system 10 terminates the indication of the personal information. In Step S98, the announcement control switches to the "no announcement" state.

The information addition system 10 can associate the additional information with second personal information, which is uniform resource locator (URL) information indicating the URL of a Web page browsed by the user, although the association of the additional information with the first personal information by the information addition system 10 is described above. An exemplary process in which the information addition system 10 associates the date and time when the URL is specified with the second personal information as eighth additional information will now be described in detail.

After specifying the URL, the navigation unit 100 supplies a signal to the information addition system 10. The information addition system 10, which has received the signal, acquires the second personal information from the navigation unit 100 and stores the acquired second personal information in the storage device 7. Simultaneously, the information addition system 10 acquires the date and time when the URL is specified from the navigation unit 100 as the eighth additional information. The information addition system 10 associates the eighth additional information with the second personal information for every date and time that is specified and stores the eighth additional information associated with the second personal information. The information addition system 10 realizes the association of the date and time when the URL is specified with the second personal information as the eighth additional information in the manner described above.

An exemplary process in which the information addition system 10 associates the update date and time of a Web page that is accessed with the second personal information as ninth additional information will now be described in detail. In this process, the controller 100a in the navigation unit 100 functions as Web page update determining means for determining whether the URL of the accessed Web page coincides with the URL indicated by the second personal information and whether, if the URL of the accessed Web page coincides with the URL indicated by the second personal information, the accessed Web page is updated. In other words, the Web page update determining means determines whether the Web page that was browsed is updated. A known method is available in the determination of whether the Web page is updated.

In addition, the controller 100a in the navigation unit 100 functions as Web page update information generating means for generating the update date and time of the Web page as Web page update information if the controller 100a determines that the Web page is updated. After the Web page update information is generated, the navigation unit 100 supplies a signal to the information addition system 10. The information addition system 10, which has received the signal, acquires the Web page update information as the ninth additional information, associates the ninth additional information with the second personal information for every update date and time, and stores the ninth additional information associated with the second personal information. The information addition system 10 realizes the association of the Web page update information with the second personal information as the ninth additional information in the manner described above.

Figure 20:
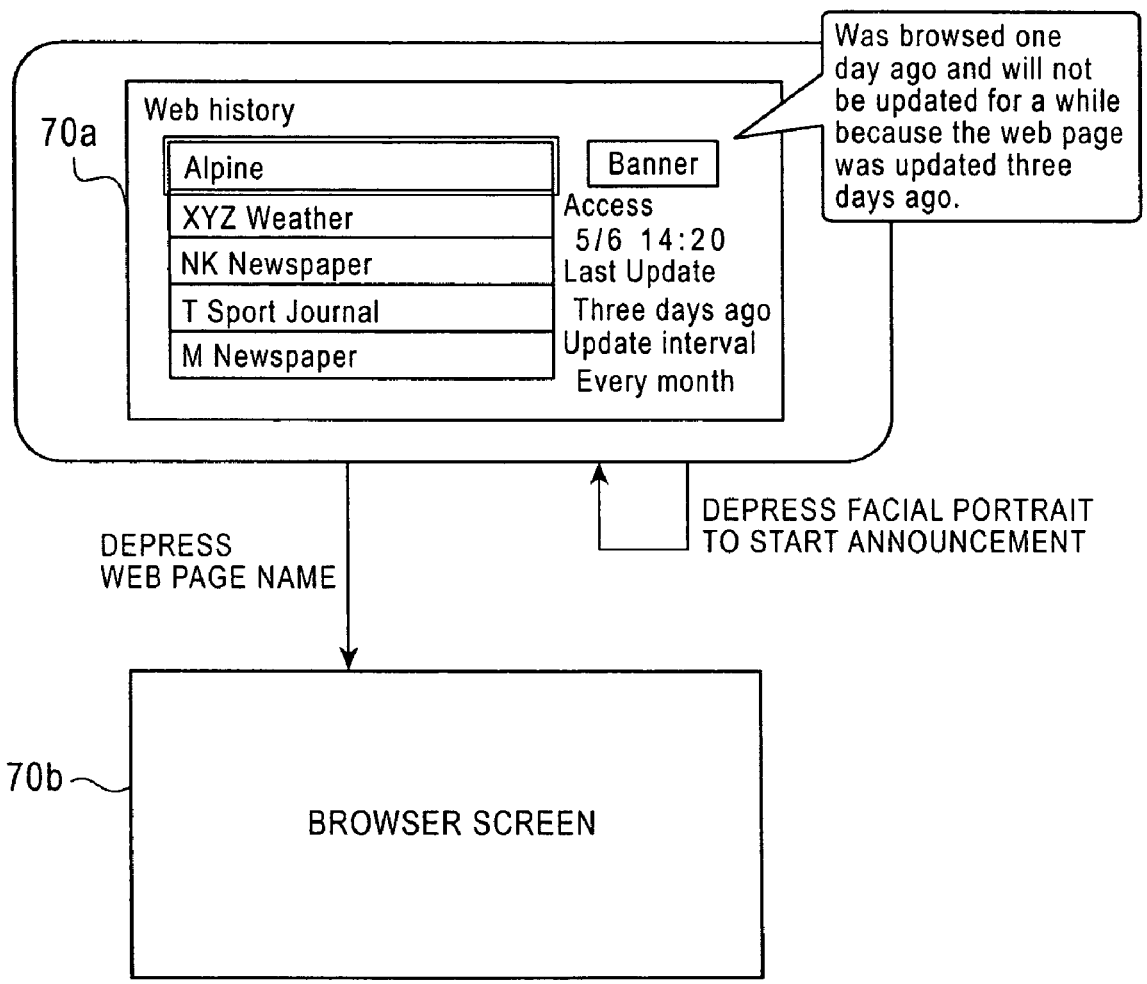
FIG. 20 illustrates an exemplary process in which the information addition system indicates eighth and ninth additional information by voice or displays the eighth and ninth additional information.

FIG. 20 illustrates an exemplary process in which the information addition system 10 indicates the eighth and ninth additional information by voice or displays the eighth and ninth additional information, according to an embodiment of the present disclosure. A display screen 70a in FIG. 20, which is a display mode of a Web history, displays the Web page names of Web pages that ware browsed. In the display screen 70a, a banner indicating the Web page name and the Web page is based on a predetermined output from the navigation unit 100 and is displayed in a common display screen of the Web history. The information in the display screen 70a is associated with the second personal information and displayed on the basis of the second personal information.

According to this embodiment of the present disclosure, the display screen 70a displays the date and time when the selected Web page was previously accessed and the date and time of the last update. The date and time when the Web page was previously accessed is displayed on the basis of the eighth additional information and the date and time of the last update is displayed on the basis of the ninth additional information. These dates and times are realized by the information addition system 10 that functions as second information indicating means for causing the screen control unit 6 to display the content of data on the basis of the additional information. According to this embodiment of the present disclosure, the display screen 70a displays an update interval. The update interval is calculated on the basis of the update date and time indicated by the ninth additional information. For example, the navigation unit 100 can calculate multiple intervals of the update date and time to calculate an interval calculated by weighted average as the update interval. The information addition system 10 associates the update interval calculated by the navigation unit 100 in the above manner with the second personal information as the additional information and stores the additional information associated with the second personal information. The display screen 70a displays the update interval on the basis of the additional information.

If the user performs no input operation for a predetermined time period with Web historical information being displayed in the display screen 70a, it is possible to make an announcement that, for example, "Was browsed one day ago and will not be updated for a while because the Web page was updated three days ago". This announcement is realized by the information addition system 10 that functions as the second information indication means for outputting by voice the content of the data on the basis of the additional information. In this announcement, "Was browsed one day ago" is based on the eighth additional information, "because the Web page was updated three days ago" is based on the ninth additional information, and "will not be updated for a while" is based on the ninth additional information and the additional information indicating the update interval. According to this embodiment of the present disclosure, since "Last update" is set to "Three days ago" and "Update interval" is set to "Every month", the announcement has the above content of the data. Depressing "Banner" in the display screen 70a can start the announcement. In this case, when "Banner" is depressed, the operating unit 5 supplies the control signal to the information addition system 10, and the information addition system 10 acquires the control signal and outputs the above content of the data by voice. The content of display or announcement may be varied by switching to the additional information to be displayed or announced, for example, on an operation screen allowing selection of the additional information. When a Web page name is depressed on the display screen 70a, the display screen 70a is switched to a browser screen shown in a display screen 70b where the Web page corresponding to the Web page name selected with the cursor is displayed.

Furthermore, according to this embodiment of the present disclosure, the eighth additional information associated with the second personal information can be used in the following manner. First, the information addition system 10 calculates, on the basis of the eighth additional information associated with the second personal information, a date and time when the Web page having the URL indicated by the second personal information is accessed. The information addition system 10 functions as access-date-and-time calculating means here. Next, the information addition system 10 generates information directing an access to the Web page whose access date and time is calculated as first access guide information. The information addition system 10 functions as first access-guide-information generating means here. The above process allows the first access guide information to be used on the basis of the second personal information.

According to this embodiment of the present disclosure, the ninth additional information can be used in the following manner. First, the information addition system 10 calculates, on the basis of the interval of the update date and time indicated by the ninth additional information, a date and time when the Web page having the URL indicated by the second personal information is updated. The information addition system 10 functions as update-date-and-time calculating means here. Next, the information addition system 10 generates information directing an access to the Web page whose update date and time is calculated as second access guide information. The information addition system 10 functions as second access-guide-information generating means here.

On the calculated access date and time, the information addition system 10 generates the first access guide information and outputs the generated first access guide information by voice. On the calculated update date and time, the information addition system 10 generates the second access guide information and outputs the generated second access guide information by voice. Accordingly, the user can access the information timely. The timing at which the information addition system 10 calculates an access frequency may be set, for example, when the information addition system 10 acquires a predetermined control signal from the operating unit 5, with which the user performs a predetermined input operation to refer to the Web history. The same applies to the timing at which the first access guide information is generated.

Although the information addition system 10 associates the additional information with second personal information in the above description, the information addition system 10 may store the first personal information, the second personal information, and the additional information associated with the first or second additional information in the storage unit 15 in the mobile telephone 1 via the hands-free unit 200. In this case, the mobile telephone 1 can independently use the additional information. Specifically, for example, the mobile telephone 1 can independently indicate the additional information to the user if the mobile telephone 1 has any information indicating means for indicating the content of data on the basis of the additional information described above. The mobile telephone 1 may have means for converting the first personal information, the second personal information, and the additional information associated with the first or second additional information into data that can be used in the mobile telephone 1. In the manner described above, it is possible to realize the information addition system 10 capable of associating a variety of information as the additional information with the first and second personal information relating to communication by the in-vehicle system 1000 using the mobile telephone 1 to indicate to the user the information useful for the user in various timings and modes and to realize the mobile telephone 1 having the first personal information, the second personal information, and the additional information.

It should be understood by those skilled in the art that various modifications, combinations, sub-combinations and alterations may occur depending on design requirements and other factors insofar as they are within the scope of the appended claims or the equivalents thereof. It is therefore intended that the foregoing detailed description be regarded as illustrative rather than limiting, and that it be understood that it is the following claims, including all equivalents, that are intended to define the spirit and scope of this disclosure.

The invention claimed is:

1. An information addition system that acquires data and a control signal from a hands-free apparatus and a navigation apparatus, the hands-free apparatus operative to communication with a mobile communication terminal, the hands-free apparatus comprising an address-book data storage unit operative to associate communication-partner information indicating a communication partner of the mobile communication terminal with name information corresponding to the communication-partner information and to store the associated information in a personal information database as first personal information, the navigation apparatus comprising a position detecting unit operative to detect a current position and to set a destination, the information addition system comprising:

an additional information acquiring unit operative to acquire date and time information indicating a date and time when the mobile communication terminal transmits an outgoing call or receives an incoming call from the navigation apparatus as first additional information and to acquire predetermined information at the outgoing call or the incoming call as second additional information; and an information adding unit operative to identify the first personal information corresponding to the communication partner at the outgoing call or the incoming call, in the personal information database, on the basis of the communication-partner information indicating the communication partner at the outgoing call or incoming call and to associate the first and second additional information, acquired by the additional information acquiring unit, with the identified first personal information and to store the first and second additional information associated with the first personal information.

2. The information addition system of claim 1,
wherein the first personal information is generated on the basis of data stored in a storage unit in the mobile communication terminal.

3. The information addition system of claim 1,
wherein the predetermined information at the outgoing call or incoming call corresponds to place-name information corresponding to the current position detected by the navigation apparatus at the outgoing call or incoming call and destination information set in the navigation apparatus.

4. The information addition system of claim 1,
wherein the communication-partner information is data indicating at least one of a telephone number and an e-mail address.

5. The information addition system of claim 1,
wherein the information addition system is further operative to acquire data and a control signal from an audio apparatus and an operating unit, the audio apparatus comprising a voice recording unit that records a voice input through a microphone, the operating unit operative to output the control signal,
wherein the voice recording unit is operative to record the voice input through the microphone as first voice-memo information when the voice recording unit acquires the control signal on the basis of a predetermined input operation from the operating unit after the communication with the mobile communication terminal at the outgoing call or incoming call is terminated, and
wherein the additional information acquiring unit is further operative to acquire the first voice-memo information recorded by the voice recording unit as third additional information, and the information adding unit is operative to associate the third additional information with the identified first personal information and to store the third additional information associated with the first personal information.

6. The information addition system of claim 1,
wherein the mobile communication terminal is a mobile telephone,
wherein the hands-free apparatus further comprises:
an answering-machine determining unit that is operative to determine whether the communication partner at the outgoing call is an answering machine and
an answering-machine information generating unit that is operative to generate answering machine information indicating that the communication partner is an answering machine if the answering-machine determining unit determines that the communication partner is an answering machine, and wherein the additional information acquiring unit is further operative to acquire the answering machine information generated by the answering-machine information generating unit as fourth additional information, and the information adding unit is further operative to associate the fourth additional information with the identified first personal information and stores the fourth additional information associated with the first personal information.

7. The information addition system of claim 1,
wherein the mobile communication terminal is a mobile telephone,
wherein the hands-free apparatus comprises:
  a response determining unit that is operative to determine whether the communication partner at the outgoing call responds or whether the mobile telephone responds at the incoming call and
  a speech-information generating unit that is operative to generate speech information if the response determining unit determines that the communication partner or the mobile telephone responds and to generate non-speech information if the response determining unit determines that the communication partner or the mobile telephone does not respond, and
wherein the additional information acquiring unit is operative to acquire the speech information or the non-speech information as fifth additional information, and the information adding unit is further operative to associate the fifth additional information with the identified first personal information and to store the fifth additional information associated with the first personal information.

8. The information addition system of claim 1,
wherein the information addition system is further operative to acquire data and a control signal from an operating unit operative to output the control signal,
wherein the hands-free apparatus comprises an address-book data outputting unit that is operative to display the content of data on the basis of address book information including the first personal information stored in the personal information database, and
wherein, if a first control signal on the basis of a predetermined input operation is acquired from the operating unit while the address-book data outputting unit displays the content of the data, the additional information acquiring unit acquires predetermined image data as sixth additional information if the additional information acquiring unit further acquires a second control signal on the basis of a predetermined input operation for selecting an image from the operating unit, and the information adding unit associates the sixth additional information with the first personal information corresponding to the content of data displayed in the address-book data outputting unit when the first control signal is acquired and stores the sixth additional information associated with the first personal information.

9. The information addition system of claim 1,
wherein the information addition system is further operative to acquire data and a control signal from an audio apparatus and an operating unit, the audio apparatus comprising a voice recording unit that records a voice input through a microphone, the operating unit operative to output the control signal,
wherein the hands-free apparatus comprises a historical information outputting unit that is operative to display the content of data on the basis of outgoing-call or incoming-call historical information including the first personal information and the first additional information,
wherein the voice recording unit is operative to record the voice input through the microphone as second voice-memo information when the voice recording unit acquires the control signal on the basis of a predetermined input operation from the operating unit while the content of the data is displayed, and
wherein the additional information acquiring unit is operative to acquire the second voice-memo information recorded by the voice recording unit as seventh additional information, and the information adding unit is operative to associate the seventh additional information with the first personal information corresponding to the content of the data displayed in the historical information outputting unit when the control signal is acquired and to store the seventh additional information associated with the first personal information.

10. The information addition system of claim 1, further comprising:
  a first information indicating unit operative to output by voice the content of data on the basis of the additional information.

11. The information addition system of claim 10,
wherein, when the mobile communication terminal transmits the outgoing call, the first information indicating unit outputs by voice the content of data on the basis of the additional information associated with the first personal information identified by the information adding unit when the mobile communication terminal transmits the outgoing call.

12. The information addition system of claim 10,
wherein, when the mobile communication terminal receives the incoming call, the first information indicating unit outputs by voice the content of data on the basis of the additional information associated with the first personal information identified by the information adding unit when the mobile communication terminal receives the incoming call.

13. The information addition system of claim 10,
wherein the mobile communication terminal is a mobile telephone, and
wherein, when the answering is held on the mobile telephone, the first information indicating unit outputs by voice the content of data on the basis of the additional information associated with the first personal information identified by the information adding unit when the mobile telephone receives the incoming call.

14. The information addition system of claim 10,
wherein the mobile communication terminal is a mobile telephone, and
wherein, when the call is placed on hold on the mobile telephone, the first information indicating unit outputs by voice the content of data on the basis of the additional information associated with the first personal information identified by the information adding unit when the mobile telephone transmits the outgoing call or receives the incoming call.

15. The information addition system of claim 10,
wherein the mobile communication terminal is a mobile telephone,
wherein the hands-free apparatus comprises as the reception settings:
  a manual response mode in which the hands-free unit does not allow automatic response to the mobile telephone and an automatic response mode in which the hands-free unit allows automatic response to the mobile telephone, and wherein, when the mobile telephone receives the incoming call, the first information indicating unit does not allow the hands-free apparatus to automatically respond to the mobile telephone until the first information indicating unit terminates the output by voice of the content of data on the basis of the additional information associated with the first personal information identified by the information adding unit when the mobile telephone receives the incoming call with the reception setting being set to the automatic response mode.

16. The information addition system of claim 10, wherein the information addition system is further operative to acquire data and a control signal from an operating unit operative to output the control signal, wherein the hands-free apparatus comprises an address-book data outputting unit that is operative to display the content of data on the basis of address book information including the first personal information stored in the personal information database, and wherein, if the control signal on the basis of a predetermined input operation is acquired from the operating unit while the content of the data is displayed, the first information indicating unit outputs by voice the content of data on the basis of the additional information associated with the first personal information corresponding to the content of the data displayed when the control signal is acquired.

17. The information addition system of claim 10, wherein the information addition system is further operative to acquire data and a control signal from an operating unit operative to output the control signal, wherein the hands-free apparatus comprises a historical information outputting unit that is operative to display the content of data on the basis of outgoing-call or incoming-call historical information including the first personal information and the first additional information, and wherein the first information indicating unit outputs by voice the content of data on the basis of the additional information associated with the first personal information corresponding to the content of the data displayed when the control signal is acquired, if the voice recording unit acquires the control signal on the basis of a predetermined input operation from the operating unit while the content of the data is displayed.

18. The information addition system of claim 10, wherein the first information indicating unit displays the content of the data, instead of outputting by voice the content of the data.

19. The information addition system of claim 1, wherein the navigation apparatus comprises a browser function, wherein the additional information acquiring unit is operative to acquire URL information indicating a specified URL from the navigation apparatus as second personal information, and wherein the information adding unit is operative to store the second personal information.

20. The information addition system of claim 19, wherein the additional information acquiring unit is operative to acquire the second personal information from the navigation apparatus and to acquire a date and time when the URL is specified as eighth additional information, and wherein the information adding unit is operative to associate the eighth additional information with the second personal information for every date and time that is specified and to store the eighth additional information associated with the second personal information.

21. The information addition system of claim 19, wherein the navigation apparatus comprises:

a Web page update determining unit that is operative to determine whether the URL of a Web page that is accessed coincides with the URL indicated by the second personal information and whether the accessed Web page is updated if the URL of the accessed Web page coincides with the URL indicated by the second personal information and a Web page update information generating unit that is operative to generate an update date and time of the Web page as Web page update information if the Web page update determining unit determines that the Web page is updated, wherein the additional information acquiring unit is operative to acquire the Web page update information from the navigation apparatus as ninth additional information, and wherein the information adding unit is operative to associate the ninth additional information with the second personal information indicating the URL of the Web page that is determined to be updated by the Web page update determining unit for every update date and time and to store the ninth additional information associated with the second personal information.

22. The information addition system of claim 20, further comprising:

a second information indicating unit that is operative to output by voice the content of data on the basis of the additional information.

23. The information addition system of claim 22, wherein the information addition system is further operative to acquire data and a control signal from an operating unit capable of outputting the control signal, wherein the navigation apparatus comprises a Web historical information outputting unit that is operative to display Web historical information including the content of data on the basis of the second personal information, and wherein, if the control signal on the basis of a predetermined input operation is not acquired from the operating unit for a predetermined time period while the content of the data is displayed, the second information indicating unit outputs by voice the content of data on the basis of the additional information associated with the second personal information corresponding to the content of the data displayed when the control signal is not acquired for the predetermined time period.

24. The information addition system of claim 22, wherein the information addition system is further operative to acquire data and a control signal from an operating unit operative to output the control signal, wherein the navigation apparatus comprises a Web historical information outputting unit that is operative to display the content of data on the basis of the second personal information as Web historical information, and wherein, when the control signal on the basis of a predetermined input operation is acquired from the operating unit while the content of the data is displayed, the second information indicating unit outputs by voice the content of data on the basis of the additional information associated with the second personal information corresponding to the content of the data displayed when the control signal is acquired.

25. The information addition system of claim 22, wherein the second information indicating unit is operative to display the content of data, instead of outputting by voice the content of the data.

26. The information addition system of claim 20, further comprising:
   an access-date-and-time calculating unit that is operative to calculate a date and time when the Web page having the URL indicated by the second personal information is accessed on the basis of the eighth additional information associated with the second personal information; and
   a first access-guide-information generating unit that is operative to generate information directing an access to the Web page whose access date and time is calculated by the access-date-and-time calculating unit as first access guide information.

27. The information addition system of claim 22, wherein, on the access date and time calculated by the access-date-and-time calculating unit, the second information indicating unit outputs by voice the first access guide information.

28. The information addition system of claim 22, further comprising:
   an update-date-and-time calculating unit that is operative to calculate a date and time when the Web page having the URL indicated by the second personal information is updated, on the basis of an interval of the update date and time indicated by ninth additional information associated with the second personal information; and
   a second access-guide-information generating unit that is operative to generate information directing an access to the Web page whose update date and time is calculated by the update-date-and-time calculating unit as second access guide information.

29. The information addition system of claim 28, wherein, on the update date and time calculated by the update-date-and-time calculating unit, the second information indicating unit is operative to output by voice the second access guide information.

30. The information addition system according to claim 1, wherein the information adding unit is operative to store the additional information in a storage device.

31. The information addition system according to claim 1, wherein the information adding unit stores the additional information, along with the first or second personal information with which the additional information is associated, in a storage unit in the mobile communication terminal.

32. A method of adding information and for acquiring data and a control signal from a hands-free apparatus and a navigation apparatus, the hands-free apparatus in communication with a mobile communication terminal and operative to associate communication-partner information indicating a communication partner of the mobile communication terminal with name information corresponding to the communication-partner information and to store the associated information in a personal information database as first personal information, the navigation apparatus operative to detect a current position and to set a destination, the method comprising the steps of:
   acquiring date and time information indicating a date and time when the mobile communication terminal transmits an outgoing call or receives an incoming call from the navigation apparatus as first additional information and acquiring predetermined information at the outgoing call or the incoming call as second additional information; and
   identifying the first personal information corresponding to the communication partner at the outgoing call or the incoming call, in the personal information database, on the basis of the communication-partner information indicating the communication partner at the outgoing call or incoming call, associating the first and second additional information with the identified first personal information, and storing the first and second additional information associated with the first personal information.

33. A method for acquiring data, the method comprising:
   acquiring date and time information with an additional information acquiring unit from a navigation apparatus as first additional information, the first additional information indicating a date and time when a mobile communication terminal performs one of transmitting an outgoing call and receiving an incoming call;
   acquiring predetermined information as second additional information with the additional information acquiring unit when the mobile communication terminal performs one of transmitting an outgoing call and receiving an incoming call;
   identifying, with the additional information acquiring unit, a first personal information corresponding to a communication partner at one of transmitting an outgoing call and receiving an incoming call, the first personal information identified in a personal information database on a basis of communication-partner information indicating the communication partner at the outgoing or incoming call;
   associating, with the additional information acquiring unit, the first and second additional information with the identified first personal information; and
   storing, with the additional information acquiring unit, the first and second additional information.

34. A computer-readable storage medium comprising a set of instructions for acquiring data, the set of instructions to direct a processor to perform acts of:
   acquiring date and time information from a navigation apparatus as first additional information, the first additional information indicating a date and time when a mobile communication terminal performs one of transmitting an outgoing call and receiving an incoming call;
   acquiring predetermined information as second additional information when the mobile communication terminal performs one of transmitting an outgoing call and receiving an incoming call;
   identifying a first personal information corresponding to a communication partner at one of transmitting an outgoing call and receiving an incoming call, the first personal information identified in a personal information database on a basis of communication-partner information indicating the communication partner at the outgoing or incoming call;
   associating the first and second additional information with the identified first personal information; and
   storing the first and second additional information.

* * * * *

UNITED STATES PATENT AND TRADEMARK OFFICE
CERTIFICATE OF CORRECTION

PATENT NO. : 7,623,854 B2 Page 1 of 1
APPLICATION NO. : 11/503670
DATED : November 24, 2009
INVENTOR(S) : Takao Satoh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 632 days.

Signed and Sealed this

Twenty-sixth Day of October, 2010

David J. Kappos
*Director of the United States Patent and Trademark Office*